(12) United States Patent
Tran

(10) Patent No.: US 9,456,131 B2
(45) Date of Patent: Sep. 27, 2016

(54) VIDEO PROCESSING SYSTEMS AND METHODS

(71) Applicant: Bao Tran, Saratoga, CA (US)

(72) Inventor: Bao Tran, Saratoga, CA (US)

( * ) Notice: Subject to any disclaimer, the term of this patent is extended or adjusted under 35 U.S.C. 154(b) by 418 days.

(21) Appl. No.: 14/093,048

(22) Filed: Nov. 29, 2013

(65) Prior Publication Data

US 2014/0085501 A1    Mar. 27, 2014

Related U.S. Application Data

(63) Continuation of application No. 12/713,183, filed on Feb. 26, 2010, now Pat. No. 8,503,539, and a continuation of application No. 13/773,270, filed on Feb. 21, 2013, now Pat. No. 8,634,476.

(60) Provisional application No. 61/308,307, filed on Feb. 26, 2010.

(51) Int. Cl.
| | |
|---|---|
| *H04N 5/232* | (2006.01) |
| *H04N 5/262* | (2006.01) |
| *H04N 5/265* | (2006.01) |
| *H04N 7/15* | (2006.01) |
| *H04N 7/18* | (2006.01) |
| *G06N 3/063* | (2006.01) |
| *G06N 3/08* | (2006.01) |
| *H04N 19/463* | (2014.01) |
| *G06F 3/00* | (2006.01) |
| *H04N 19/436* | (2014.01) |

(52) U.S. Cl.
CPC .......... *H04N 5/23222* (2013.01); *G06F 3/005* (2013.01); *G06N 3/063* (2013.01); *G06N 3/084* (2013.01); *H04N 5/23229* (2013.01); *H04N 5/23238* (2013.01); *H04N 5/265* (2013.01); *H04N 5/2628* (2013.01); *H04N 7/15* (2013.01); *H04N 7/181* (2013.01); *H04N 19/436* (2014.11)

(58) Field of Classification Search
CPC ...... G06F 3/005; G06N 3/063; G06N 3/084; H04N 19/436; H04N 5/23222; H04N 5/23229; H04N 5/23238; H04N 5/2628; H04N 5/265; H04N 7/15; H04N 7/181
USPC ..................................................... 375/240.26
See application file for complete search history.

(56) References Cited

U.S. PATENT DOCUMENTS

| | | | | |
|---|---|---|---|---|
| 5,917,544 | A * | 6/1999 | Sobotta ................ | H04N 3/155 250/208.1 |
| 2005/0008240 | A1* | 1/2005 | Banerji ............... | H04N 5/2624 382/238 |
| 2008/0271072 | A1* | 10/2008 | Rothschild .......... | H04H 60/50 725/35 |
| 2009/0060032 | A1* | 3/2009 | Schmit ................ | H04N 19/61 375/240.01 |
| 2010/0111489 | A1* | 5/2010 | Presler ................ | H04N 5/225 386/278 |
| 2011/0058708 | A1* | 3/2011 | Ikenoue .............. | G06T 7/2046 382/103 |

\* cited by examiner

*Primary Examiner* — Anner Holder
(74) *Attorney, Agent, or Firm* — Tran & Associates

(57) ABSTRACT

A smart camera system is disclosed. The camera can work with cloud data storage systems and compute cloud. A call center can access the cloud to provide security monitoring services.

20 Claims, 16 Drawing Sheets

VIDEO PROCESSING SYSTEMS AND METHODS

The present application claims priority to Provisional Application Ser. No. 61/308,307 filed Feb. 26, 2010, and application Ser. No. 12/713,183 filed Feb. 26, 2010 and Ser. No. 13/773,270 filed Feb. 21, 2013, the content of which is incorporated by reference.

BACKGROUND

The present invention relates to video processing systems.

Advances in imaging technology have led to high resolution cameras for personal use as well as professional use. Personal uses include digital cameras and camcorders that can capture high quality images and videos. Professional uses include video conferencing systems and security cameras.

Video conferencing systems have rapidly evolved in capability. As more and more companies look for cost savings, high-tech solutions such as telepresence and video conferencing services are becoming more popular. Telepresence systems deliver lifelike, high-definition images and spatially discrete audio for immersive experiences using advanced visual, audio, and collaboration technologies.

Telepresence is an experience based on videoconferencing. Conventional telepresence systems are expensive as of 2010. Generally costing from $80 to $500K per system, systems creating a telepresence effect provide life-size images of the face and upper body of the remote participants while maintaining a position and proximity perspective that allows the remote participants to appear to be sitting on the other side of a conference-room table.

Another use of high resolution cameras is in video surveillance. The video surveillance equipment market includes CCTV cameras, Digital Video Recorders (DVRs) and Network Video Recorders (NVRs), and IP Encoder/Streamers. The transition from traditional CCTV surveillance to networked digital surveillance is revolutionary for the physical security industry. Network camera systems, for example network surveillance camera systems or IP camera systems, have existed for a number of years but have undergone relatively slow industry adoption. Compared to traditional analog camera systems, network camera systems offer advantages such as accessibility, integration, low installation costs, scalability, and an ability to move to higher resolution video. Data produced by network cameras, however, demand large amounts of bandwidth and storage capacity.

Typical storage architecture of network camera systems is configured similarly to traditional analog systems. The architecture includes centrally located digital video recorders (DVRs) or network video recorders (NVRs) connected through a network to IP cameras. The typical architecture is inadequate for a number of reasons. For example, most DVRs and NVRs do not include open platforms such that a system is limited to one brand for future replacements and upgrades. Also, most DVRs and NVRs do not meet IT standards for system resiliency, redundancy, and long-term archiving of video data. Additionally, typical network camera systems often lack storage scalability such that, as network camera systems expand, storage systems constantly need to be expanded.

Recently, some network camera systems have implemented video analytics processing to identify when important events (such as object movement) are being captured by a video camera. Video analytics has been primarily used to alert security of potential unwanted events. Most video analytics is performed by a central processor that is common to multiple cameras, but some video cameras have built-in video analytics capabilities. These video cameras with built-in analytics, however, have not included large capacity storage due to the large storage requirements of the video data generated by the camera. Also, there are some cameras configured without built-in video analytics but with built-in small storage capacity that is insufficient to serve as a substitute for traditional DVRs and NVRs.

As noted in United States Patent Application 20090219411, video analytics and a mass storage unit are contained in a camera housing of a video camera. The video analytics analyzes video data produced by the video camera and detects whether there is an occurrence of a defined event of interest. The video data representing the field of view of the scene observed by the video camera are stored in the mass storage unit.

United States Patent Application 20080204569 performs a seed search of a subset of analytical data corresponding to video objects displayable in a plurality of video frames is carried out to identify video objects that most closely match a selected video object and then complete searches of the analytical data may be carried out so as to identify video objects that most closely match each video object identified during the seed search. The video objects having the greatest number of occurrences of being identified during the complete searches may be displayed by a graphical user interface (GUI). In this way, the GUI may display the video objects in an order based on how closely each video object matches the selected video object and/or a video object identified during the seed search, which may an order different than an order based on a time when each video object was captured.

SUMMARY

1. A smart camera includes:
   an imager;
   a video analytic engine (VA) coupled to the imager;
   an advanced video coding (AVC) engine coupled to the imager; and
   a network processor coupled to the VA engine and the AVC engine.
2. The smart camera of claim 1, wherein the AVC engine comprises an H.264 engine.
3. The smart camera of claim 1, wherein the AVC engine performs scalable video coding (SVC).
4. The smart camera of claim 1, wherein the VA engine comprises a cellular neural network (CNN).
5. The smart camera of claim 1, wherein the VA engine and the AVC engine comprise a graphic processing unit (GPU) having a plurality of processors to process a plurality of computing threads.
6. The smart camera of claim 1, wherein a video comprises a plurality of video slices and wherein the VA engine and the AVC engine comprise a graphic processing unit (GPU) having a plurality of processors each processing a slice.
7. The smart camera of claim 1, comprising a call center coupled to the network processor.
8. The smart camera of claim 1, comprising an elastic compute cloud coupled to the network processor.
9. The smart camera of claim 1, comprising a cloud based data storage device coupled to the network processor.
10. The smart camera of claim 1, comprising a parallel search engine coupled to the cloud based data storage device.

11. A smart camera, comprising:
    an imager to capture a video having a plurality of slices;
    a video analytic engine (VA) coupled to the imager;
    an advanced video coding (AVC) engine coupled to the imager; and
    a network processor coupled to the VA engine and the AVC engine,
    wherein the VA engine and the AVC engine comprise a graphic processing unit (GPU) having a plurality of processors each processing a slice.
12. The smart camera of claim 11, wherein the AVC engine comprises an H.264 engine.
13. The smart camera of claim 11, wherein the AVC engine performs scalable video coding (SVC).
14. The smart camera of claim 11, wherein the VA engine comprises a cellular neural network (CNN).
15. The smart camera of claim 11, wherein the VA engine and the AVC engine comprise a graphic processing unit (GPU) having a plurality of processors to process a plurality of computing threads.
16. The smart camera of claim 11, wherein a video comprises a plurality of video slices and wherein the VA engine and the AVC engine comprise a graphic processing unit (GPU) having a plurality of processors each processing a slice.
17. The smart camera of claim 11, comprising a call center coupled to the network processor.
18. The smart camera of claim 1, comprising an elastic compute cloud coupled to the network processor.
19. The smart camera of claim 11, comprising a cloud based data storage device coupled to the network processor.
20. The smart camera of claim 11, comprising a parallel search engine coupled to the cloud based data storage device.
21. A smart camera, comprising:
    an imager to capture a video;
    a video analytic (VA) engine coupled to the imager, the VA engine detecting objects in an image and generating metadata for each object and video;
    an advanced video coding (AVC) engine coupled to the imager; and
    a network processor coupled to the VA engine and the AVC engine; and
    a cloud based data storage device coupled to the network processor to store the video and affiliated metadata.
22. The smart camera of claim 21, wherein the AVC engine comprises an H.264 engine.
23. The smart camera of claim 21, wherein the AVC engine performs scalable video coding (SVC).
24. The smart camera of claim 21, wherein the VA engine comprises a cellular neural network (CNN).
25. The smart camera of claim 21, wherein the VA engine and the AVC engine comprise a graphic processing unit (GPU) having a plurality of processors to process a plurality of computing threads.
26. The smart camera of claim 21, wherein a video comprises a plurality of video slices and wherein the VA engine and the AVC engine comprise a graphic processing unit (GPU) having a plurality of processors each processing a slice.
27. The smart camera of claim 21, comprising a call center coupled to the network processor.
28. The smart camera of claim 21, comprising an elastic compute cloud coupled to the network processor.
29. The smart camera of claim 21, wherein the cloud based data storage device comprises a parallel database.
30. The smart camera of claim 21, comprising a parallel search engine coupled to the cloud based data storage device.
31. A smart camera, comprising:
    an imager to capture a video;
    a face recognition engine coupled to the imager, the face recognition engine detecting faces in an image and generating metadata for each face and video;
    an advanced video coding (AVC) engine coupled to the imager; and
    a network processor coupled to the face recognition engine and the AVC engine; and
    a cloud based data storage device coupled to the network processor to store the video and affiliated metadata.
32. A smart camera, comprising:
    an imager to capture a video;
    an object recognition engine coupled to the imager, the object recognition engine detecting objects in an image and generating metadata for each object and video;
    an advanced video coding (AVC) engine coupled to the imager; and
    a network processor coupled to the object recognition engine and the AVC engine; and
    a cloud based data storage device coupled to the network processor to store the video and affiliated metadata.
33. A smart camera, comprising:
    an imager to capture a video;
    a falls detection engine coupled to the imager, the falls detection engine detecting people on a floor in an image and generating metadata for each people and video;
    an advanced video coding (AVC) engine coupled to the imager; and
    a network processor coupled to the falls detection engine and the AVC engine; and
    a cloud based data storage device coupled to the network processor to store the video and affiliated metadata.
34. A smart camera, comprising:
    an imager to capture a video;
    a theft detection engine coupled to the imager, the theft detection engine detecting objects in an image and generating metadata for each object and video;
    an advanced video coding (AVC) engine coupled to the imager; and
    a network processor coupled to the theft detection engine and the AVC engine; and
    a cloud based data storage device coupled to the network processor to store the video and affiliated metadata.
35. A smart camera, comprising:
    an imager to capture a video;
    a blob recognition engine coupled to the imager, the blob recognition engine detecting objects in an image and generating metadata for each object and video;
    an advanced video coding (AVC) engine coupled to the imager; and
    a network processor coupled to the blob recognition engine and the AVC engine; and a cloud based data storage device coupled to the network processor to store the video and affiliated metadata.

36. A smart camera, comprising:
    an imager to capture a video;
    a loitering recognition engine coupled to the imager, the loitering recognition engine detecting objects in an image and generating metadata for each object and video;
    an advanced video coding (AVC) engine coupled to the imager; and
    a network processor coupled to the loitering recognition engine and the AVC engine; and
    a cloud based data storage device coupled to the network processor to store the video and affiliated metadata.

37. A smart camera, comprising:
    an imager to capture a video;
    a forbidden area recognition engine coupled to the imager, the forbidden area recognition engine detecting objects in an image and generating metadata for each object and video;
    an advanced video coding (AVC) engine coupled to the imager; and
    a network processor coupled to the forbidden area recognition engine and the AVC engine; and
    a cloud based data storage device coupled to the network processor to store the video and affiliated metadata.

38. A smart camera, comprising:
    an imager to capture a video;
    a traffic flow recognition engine coupled to the imager, the traffic flow recognition engine detecting objects in an image and generating metadata for each object and video;
    an advanced video coding (AVC) engine coupled to the imager; and
    a network processor coupled to the traffic flow recognition engine and the AVC engine; and
    a cloud based data storage device coupled to the network processor to store the video and affiliated metadata.

39. A smart camera, comprising:
    an imager to capture a video;
    a wrong way recognition engine coupled to the imager, the wrong way recognition engine detecting objects in an image and generating metadata for each object and video;
    an advanced video coding (AVC) engine coupled to the imager; and
    a network processor coupled to the wrong way recognition engine and the AVC engine; and
    a cloud based data storage device coupled to the network processor to store the video and affiliated metadata.

40. A smart camera, comprising:
    an imager to capture a video;
    a recognition engine coupled to the imager, the recognition engine detecting in parallel in an image one or more of: people count, lost or stolen object, object in a forbidden area, speed detection, loitering, wrong way detection, the recognition engine generating metadata for each object and video;
    an advanced video coding (AVC) engine coupled to the imager; and
    a network processor coupled to the recognition engine and the AVC engine; and
    a cloud based data storage device coupled to the network processor to store the video and affiliated metadata.

41. A cloud processing system, comprising:
    an imager to capture a video;
    an analytic engine coupled to the imager; and
    a network processor coupled to the analytic engine; and
    a cloud based data storage device coupled to the network processor to store the video and affiliated metadata.

42. The system of claim 41, comprising an AVC engine.

43. The system of claim 42, wherein the AVC engine performs scalable video coding (SVC).

44. The system of claim 41, comprising a video analytic (VA) engine.

45. The system of claim 41, wherein the engine comprises a graphic processing unit (GPU) having a plurality of processors to process a plurality of computing threads.

46. The system of claim 45, wherein a video comprises a plurality of video slices, comprising a graphic processing unit (GPU) having a plurality of processors each processing a slice.

47. The system of claim 41, comprising a call center coupled to the network processor.

48. The system of claim 41, comprising an elastic compute cloud coupled to the network processor.

49. The system of claim 41, wherein the cloud based data storage device comprises a parallel database.

50. The system of claim 41, comprising a parallel search engine coupled to the cloud based data storage device.

51. A cloud processing system, comprising:
    an imager to capture a video;
    an analytic engine coupled to the imager; and
    a network processor coupled to the analytic engine; and
    a compute cloud coupled to the network processor to store the video and affiliated metadata, the compute cloud supporting parallel searching of one or more objects in the video.

52. The system of claim 51, comprising an AVC engine.

53. The system of claim 52, wherein the AVC engine performs scalable video coding (SVC).

54. The system of claim 51, comprising a video analytic (VA) engine.

55. The system of claim 51, wherein the engine comprises a graphic processing unit (GPU) having a plurality of processors to process a plurality of computing threads.

56. The system of claim 55, wherein a video comprises a plurality of video slices, comprising a graphic processing unit (GPU) having a plurality of processors each processing a slice.

57. The system of claim 51, comprising a call center coupled to the network processor.

58. The system of claim 51, comprising a data storage cloud coupled to the network processor.

59. The system of claim 58, wherein the cloud based data storage device comprises a parallel database.

60. The system of claim 58, comprising a parallel search engine coupled to the cloud based data storage device.

61. A system to provide security monitoring, comprising:
    one or more security cameras, each comprising:
        an imager to capture a video;
        an analytic engine coupled to the imager; and
        a network processor coupled to the analytic engine;
    a compute cloud coupled to the network processor to store the video and affiliated metadata, the compute cloud supporting parallel searching of one or more objects in the video; and a plurality of call center agents coupled to the compute cloud to monitor security.

62. The system of claim 61, comprising an AVC engine.
63. The system of claim 62, wherein the AVC engine performs scalable video coding (SVC).
64. The system of claim 61, comprising a video analytic (VA) engine.
65. The system of claim 61, wherein the engine comprises a graphic processing unit (GPU) having a plurality of processors to process a plurality of computing threads.
66. The system of claim 65, wherein a video comprises a plurality of video slices, comprising a graphic processing unit (GPU) having a plurality of processors each processing a slice.
67. The system of claim 61, comprising a call center coupled to the network processor.
68. The system of claim 61, comprising a data storage cloud coupled to the network processor.
69. The system of claim 68, wherein the cloud based data storage device comprises a parallel database.
70. The system of claim 68, comprising a parallel search engine coupled to the cloud based data storage device.
71. A system to provide security monitoring, comprising:
    a cloud data storage engine to receive video with metadata from one or more security cameras, each comprising an imager to capture a video; an analytic engine coupled to the imager to identify objects in a video frame and annotate the video with metadata; and a network processor coupled to the analytic engine; and
    a compute cloud coupled to the network processor to store the video and affiliated metadata, the compute cloud supporting parallel searching of one or more objects in the video; and
    a security workstation coupled to the compute cloud, the workstation running a graphical user interface to specify a query by example.
72. The system of claim 71, comprising a plurality of call center agents coupled to the compute cloud to monitor security.
73. The system of claim 72, wherein the AVC engine performs scalable video coding (SVC).
74. The system of claim 71, comprising a video analytic (VA) engine.
75. The system of claim 71, wherein the engine comprises a graphic processing unit (GPU) having a plurality of processors to process a plurality of computing threads.
76. The system of claim 75, wherein a video comprises a plurality of video slices, comprising a graphic processing unit (GPU) having a plurality of processors each processing a slice.
77. The system of claim 71, comprising a call center coupled to the network processor.
78. The system of claim 71, comprising a data storage cloud coupled to the network processor.
79. The system of claim 78, wherein the cloud based data storage device comprises a parallel database.
80. The system of claim 78, comprising a parallel search engine coupled to the cloud based data storage device.
81. A search engine to provide security monitoring, comprising:
    a cloud data storage engine to receive video with metadata from one or more security cameras, each comprising an imager to capture a video; an analytic engine coupled to the imager to identify objects in a video frame and annotate the video with metadata; and a network processor coupled to the analytic engine; and
    a compute cloud coupled to the network processor to store the video and affiliated metadata, the compute cloud supporting parallel searching of one or more objects in the video; and
    an indexing engine coupled to the cloud data storage engine, the indexing engine providing indices to matches in response to a query by example.

Advantages of the preferred embodiments may include one or more of the following. The implementation described above reduces video data storage and network bandwidth requirements of a distributed network video surveillance system that includes network communication paths between network video imaging devices and network video data stores. In such surveillance system, the network video imaging devices produce video data representing fields of view of scenes under observation by the video imaging devices, and the network video data stores store video information corresponding to the video data produced by the network video imaging devices. Each of multiple ones of the network video imaging devices is associated with a content-aware video data storage system that is capable of selective storage of video data produced by its associated network video imaging device. The content-aware video data storage system includes video analytics that analyzes the content of the video data and local video data stores that store portions of the video data in response to the analysis by the vide analytics. Video data corresponding to the portions of video data are delivered through the network communication paths to the network video data stores to provide a managed amount of video data representing at a specified quality level the fields of view of the scenes. The managed amount of the video data consumes substantially less network bandwidth and fewer data storage resources than those which would be consumed by delivery to the network video stores the video data produced by the network video imaging devices at the specified quality level and in the absence of analysis by the video analytics. While video surveillance applications are of particular interest, the above approach is applicable across a wide variety of video applications.

The network camera system produces high quality video data, requires less storage capacity and network bandwidth, meets IT standards, is easily scalable, and operates for a longer period of time without storage device replacement. The cloud based storage devices can be backed up and improve system reliability. Since video data is archived or stored redundantly, the system avoids the need to replace storage devices or other maintenance issue.

Additional aspects and advantages will be apparent from the following detailed description of preferred embodiments, which proceeds with reference to the accompanying drawings.

BRIEF DESCRIPTION OF THE DRAWINGS

FIG. 5A shows an embodiment of a camera with GPU engines therein, while

DESCRIPTION OF PREFERRED EMBODIMENTS

Figure 1:
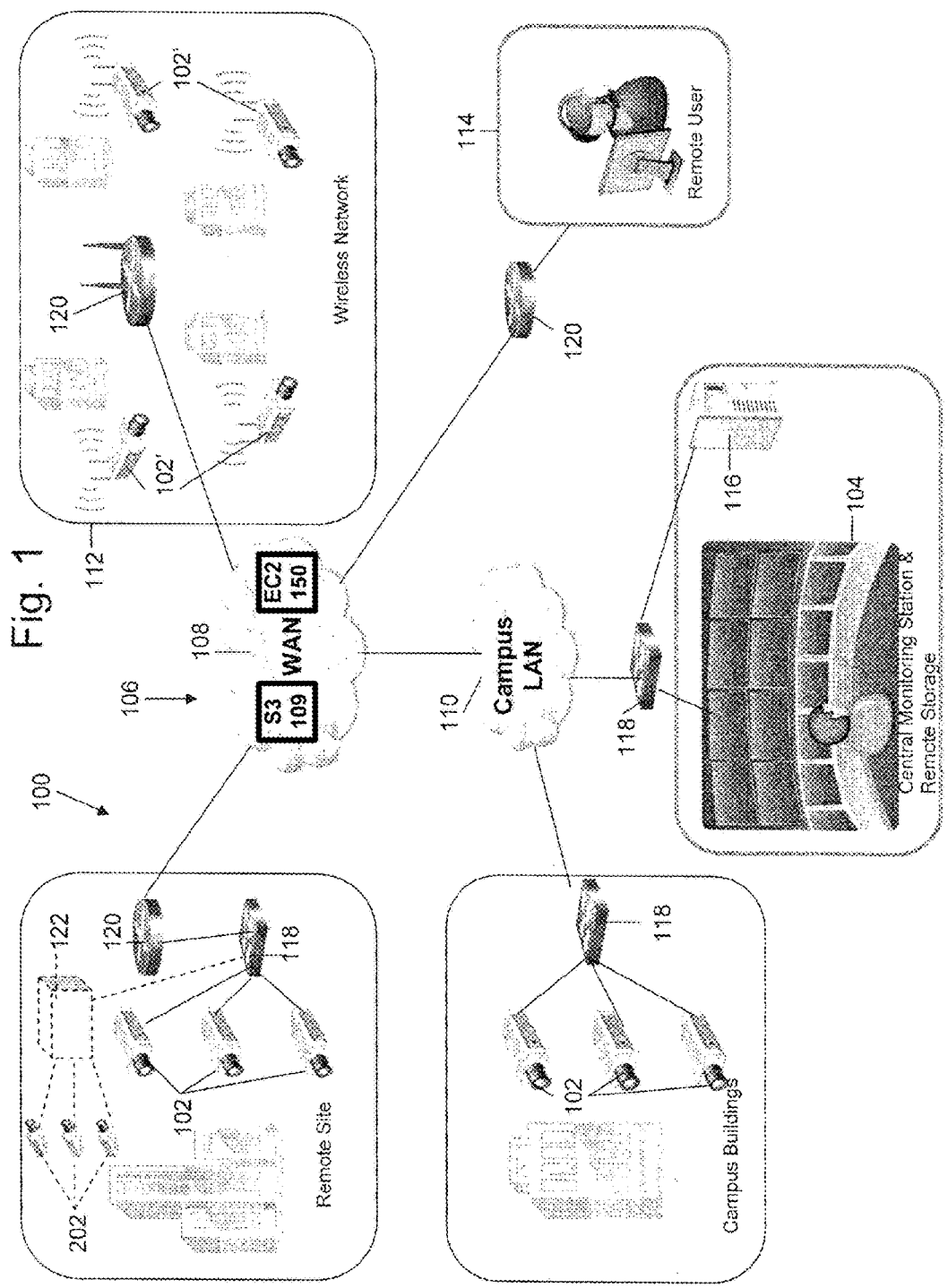
FIG. 1 is a pictorial diagram depicting an embodiment of a smart network camera system 100 utilized with cloud-based storage and processing.

System components with like reference numerals perform the same functions in each of the embodiments of a content aware storage system described below.

FIG. 1 is a pictorial diagram depicting an embodiment of a smart network camera system 100 utilized with cloud-based storage and processing. Network camera system 100 is not limited to video surveillance or to the application depicted, but may be used in video conferencing or in any network communication system. Network camera system 100 includes network cameras 102 connected to a central monitoring station 104 through a network 106 that includes a wide area network (WAN) 108 and a campus local area network (LAN) 110. Details on exemplary cameras 102 are shown in FIGS. 3-6.

The WAN 108 includes a data storage system 109. In one embodiment, the data storage system 109 can be Amazon's Simple Storage Service (Amazon S3) storage for the Internet. The network camera system 100 stores video and/or images on S3. Amazon S3 provides a simple web services interface that can be used to store and retrieve any amount of data, at any time, from anywhere on the web. Users of the network camera 100 can access the same highly scalable, reliable, fast, inexpensive data storage infrastructure that Amazon uses to run its own global network of web sites.

Network 106 may also include a wireless network 112 that includes network cameras 102 with wireless communication capabilities. Network 106 establishes multiple network communications paths. The following descriptions of network camera 102 apply also to network camera 102'. Network 106 is not limited to the configuration depicted, but may include various configurations and types of networks. A remote user 114 may also be connected to network cameras 102 through WAN 108. Network cameras 102 may be connected to a remote storage unit 116 (i.e., a network data store). Cameras 102-102' may operate in the visual range of the electromagnetic spectrum or may include other ranges including infrared (IR) and ultraviolet (UV). Voice recorder may be used in conjunction with the images acquired by cameras 102 to identify a person. The voice recorder is not required and zero to any number of voice recorders could be used. Network camera system 100 may also include various switches 118 and routers 120 to facilitate communication over network 106.

In operation, network cameras 102 capture various fields of view and generate data representing the fields of view. Certain applications may require substantially continuous operation of network camera 102. The data is communicated to central monitoring station 104, in which a user may view video or images, generated from the data, depicting the fields of view. Also, the data may be communicated to remote user 114 to generate images of the fields of view. The data may be stored in the web data storage system 109 or alternatively stored on a remote storage unit 116 and later accessed by a user.

Further, the WAN 108 includes an elastic compute cloud (EC2) 150 that enables the camera system 100 to increase or decrease video processing capacity within minutes, not hours or days. The system can commission one, hundreds or even thousands of server instances simultaneously to perform deep searching of images to locate a particular individual captured by the cameras, for example. The system can select a configuration of memory, CPU, instance storage, and the boot partition size that is optimal for its choice of operating system and application. The compute cloud offers a highly reliable environment where replacement processor instances can be rapidly and predictably commissioned. The Amazon embodiment runs within Amazon's proven network infrastructure and datacenters and Amazon EC2's Service Level Agreement commitment is 99.95% availability for each Amazon EC2 Region. Moreover, on-Demand Instances let security camera users or operators pay for compute capacity by the hour with no long-term commitments. This frees the system operator from the costs and complexities of planning, purchasing, and maintaining hardware and transforms what are commonly large fixed costs into much smaller variable costs. On-Demand Instances also remove the need to buy "safety net" capacity to handle periodic traffic spikes. Other features such as Auto Scaling allow the camera system 100 to automatically scale its Amazon EC2 capacity up or down according to predefined conditions. With Auto Scaling, the system of FIG. 1 can ensure that the number of Amazon EC2 instances needed scales up seamlessly during demand spikes to maintain storage size or video analytic performance, and scales down automatically during demand lulls to minimize costs. Auto Scaling is particularly well suited for security monitoring applications that experience hourly, daily, or weekly variability in usage. The EC2 150 also provides Elastic Load Balancing, which automatically distributes incoming application traffic across multiple Amazon EC2 instances. It enables the system to achieve even greater fault tolerance in video processing, seamlessly providing the amount of load balancing capacity needed in response to incoming camera video traffic. Elastic Load Balancing detects unhealthy instances within a pool and automatically reroutes traffic to healthy instances until the unhealthy instances have been restored.

Although the above embodiments have been described, network camera 102 is not limited to the above embodiments. Network camera 102 may include any camera system capable of analyzing the content of video data to detect motion or another event of interest, and capable of generating more than one quality level of video data.

Figure 2:
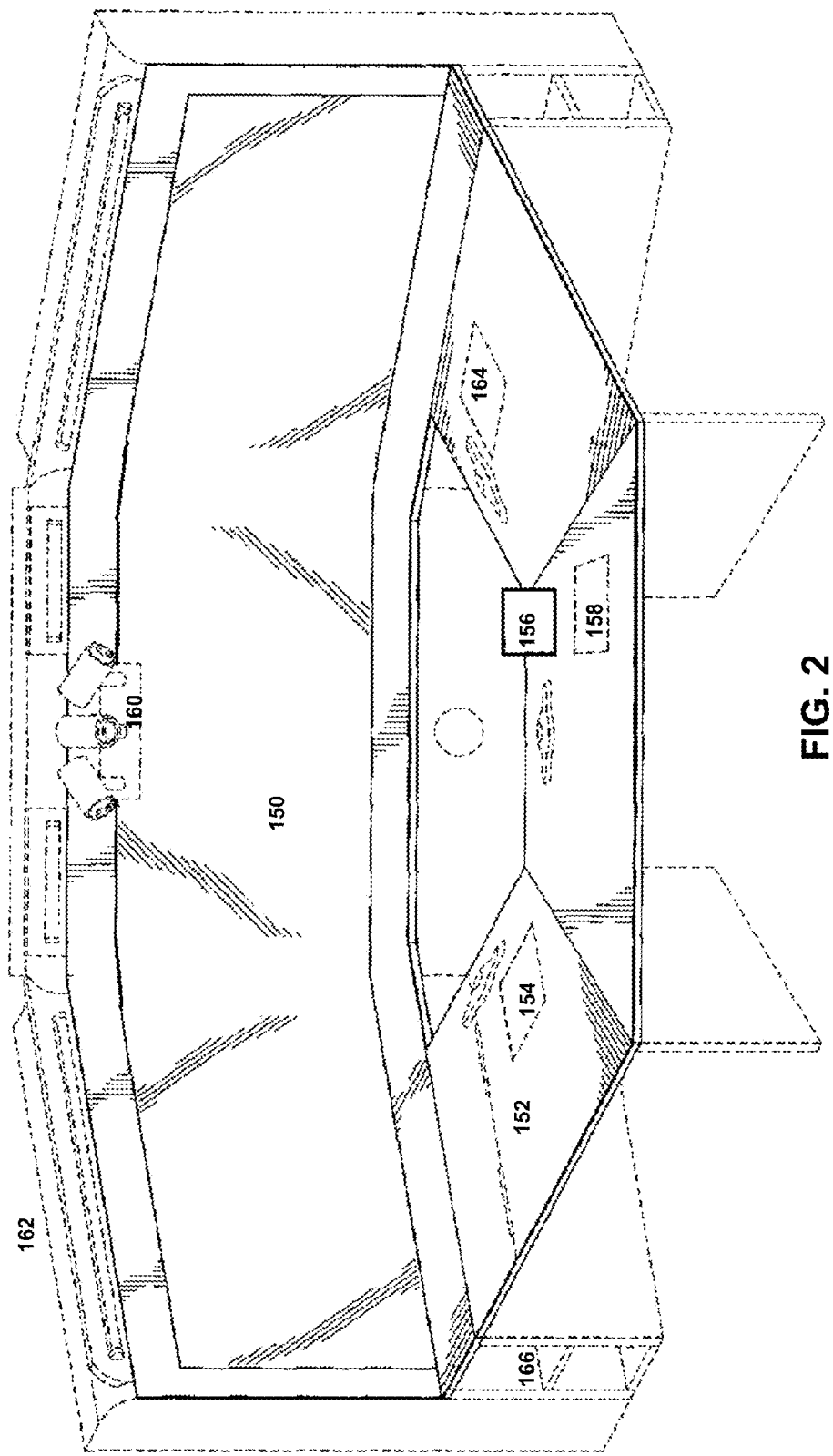
FIG. 2 shows an exemplary telepresence conferencing system.

FIG. 2 shows an exemplary telepresence conferencing system. The system has a wide field display 150 that provides viewers with an immersive 180 degree view of participants on the other side of the call. A wide view camera 160 captures a 180 degree view of participants and transmits such video to the other side of the conference call. The wide view camera 160 can be one camera fitted with wide angle lens and suitable distortion removing image processor, or can be three separate camera each capturing left, center and right views, respectively. The system can have optional lights 162 to provide lighting to provide high quality images of the physical participants. In one embodiment, the system has desks with a series of surfaces 152 that form an oval physical table space while the display 150 shows the virtual participants. In another embodiment, the system has desks with a series of surfaces 152 that form a semicircular physical table space while the display 150 shows the virtual participants and a matching virtual table space that mirrors the semicircular physical table. The surface 152 includes computers 154, 158 and 164 such as laptop computers. The table also includes an LCD control panel 156 that allows users to control and operate the conferencing system.

In one embodiment, the conferencing system includes a 3D scanner 166. The scanner allows the participants to share 3D shape information with others. The 3D scanner 166 transmits 3D shape data that can be displayed on the display 150 and manipulated using suitable 3D imaging or CAD programs. The purpose of a 3D scanner is usually to create a point cloud of geometric samples on the surface of the subject. These points can then be used to extrapolate the shape of the subject (a process called reconstruction). If color information is collected at each point, then the colors on the surface of the subject can also be determined. Like cameras, they have a cone-like field of view, and like cameras, they can only collect information about surfaces that are not obscured. While a camera collects color information about surfaces within its field of view, 3D scanners collect distance information about surfaces within its field of view. The "picture" produced by a 3D scanner describes the distance to a surface at each point in the picture. Together with distance, which corresponds to the r component, these spherical coordinates fully describe the three dimensional position of each point in the picture, in a local coordinate system relative to the scanner.

Also, more details on the 3D scanner of FIG. 2 are discussed next. The system can work with a variety of 3D scanners to communicate shape information with remote conferencing participants. The two types of 3D scanners are contact and non-contact. Non-contact 3D scanners can be further divided into two main categories, active scanners and passive scanners. There are a variety of technologies that fall under each of these categories. Contact 3D scanners probe the subject through physical touch. A CMM (coordinate measuring machine) is an example of a contact 3D scanner. It is used mostly in manufacturing and can be very precise. The disadvantage of CMMs though, is that it requires contact with the object being scanned. Thus, the act of scanning the object might modify or damage it. This fact is very significant when scanning delicate or valuable objects such as historical artifacts. The other disadvantage of CMMs is that they are relatively slow compared to the other scanning methods. Physically moving the arm that the probe is mounted on can be very slow and the fastest CM Ms can only operate on a few hundred hertz. In contrast, an optical system like a laser scanner can operate from 10 to 500 kHz. Non-contact scanners can be active scanners that emit radiation or light and detect its reflection in order to probe an object or environment. Possible types of emissions used include light, ultrasound or x-ray. A time-of-flight lidar scanner may be used to scan buildings, rock formations, etc., to produce a 3D model. The lidar can aim its laser beam in a wide range: its head rotates horizontally, a mirror flips vertically. The laser beam is used to measure the distance to the first object on its path. The time-of-flight 3D laser scanner is an active scanner that uses laser light to probe the subject. At the heart of this type of scanner is a time-of-flight laser rangefinder. The laser rangefinder finds the distance of a surface by timing the round-trip time of a pulse of light. A laser is used to emit a pulse of light and the amount of time before the reflected light is seen by a detector is timed. Since the speed of light c is a known, the round-trip time determines the travel distance of the light, which is twice the distance between the scanner and the surface. The laser rangefinder only detects the distance of one point in its direction of view. Thus, the scanner scans its entire field of view one point at a time by changing the range finder's direction of view to scan different points. The view direction of the laser rangefinder can be changed either by rotating the range finder itself, or by using a system of rotating mirrors. The latter method is commonly used because mirrors are much lighter and can thus be rotated much faster and with greater accuracy. Typical time-of-flight 3D laser scanners can measure the distance of 10,000~100,000 points every second. A triangulation 3D laser scanner is also an active scanner that uses laser light to probe the environment. With respect to time-of-flight 3D laser scanner the triangulation laser shines a laser on the subject and exploits a camera to look for the location of the laser dot. Depending on how far away the laser strikes a surface, the laser dot appears at different places in the camera's field of view. This technique is called triangulation because the laser dot, the camera and the laser emitter form a triangle. The length of one side of the triangle, the distance between the camera and the laser emitter is known. The angle of the laser emitter corner is also known. The angle of the camera corner can be determined by looking at the location of the laser dot in the camera's field of view. These three pieces of information fully determine the shape and size of the triangle and gives the location of the laser dot corner of the triangle. In most cases a laser stripe, instead of a single laser dot, is swept across the object to speed up the acquisition process. In a Conoscopic system, a laser beam is projected onto the surface and then the immediate reflection along the same ray-path are put through a conoscopic crystal and projected onto a CCD. The result is a diffraction pattern, that can be frequency analyzed to determine the distance to the measured surface. The main advantage with Conoscopic Holography is that only a single ray-path is needed for measuring, thus giving an opportunity to measure for instance the depth of a finely drilled hole. Structured-light 3D scanners project a pattern of light on the subject and look at the deformation of the pattern on the subject. The pattern may be one dimensional or two dimensional. An example of a one dimensional pattern is a line. The line is projected onto the subject using either an LCD projector or a sweeping laser. A camera, offset slightly from the pattern projector, looks at the shape of the line and uses a technique similar to triangulation to calculate the distance of every point on the line. In the case of a single-line pattern, the line is swept across the field of view to gather distance information one strip at a time. Modulated light 3D scanners shine a continually changing light at the subject. Usually the light source simply cycles its amplitude in a sinusoidal pattern. A camera detects the reflected light and the amount the pattern is shifted by determines the distance the light traveled. Modulated light also allows the scanner to ignore light from sources other than a laser, so there is no interference. Photometric systems usually use a single camera, but take multiple images under varying lighting conditions. These techniques attempt to invert the image formation model in order to recover the surface orientation at each pixel. This sort of 3D scanning is based on the principles of photogrammetry. It is also somewhat similar in methodology to panoramic photography, except that the photos are taken of one object on a three-dimensional space in order to replicate it instead of taking a series of photos from one point in a three-dimensional space in order to replicate the surrounding environment. Alternatively, computed tomography, microtomography, magnetic resonance imaging (MRI) techniques can be used in the 3D scanner.

In addition, a rapid prototyping machine can be installed to render the 3D data into a physical model for the participants to touch and feel. Rapid prototyping is the automatic construction of physical objects using additive manufacturing technology. The first techniques for rapid prototyping became available in the late 1980s and were used to produce models and prototype parts. Today, they are used for a much wider range of applications and are even used to manufacture production-quality parts in relatively small numbers. The use of additive manufacturing technology for rapid prototyping takes virtual designs from computer aided design (CAD) or animation modeling software, transforms them into thin, virtual, horizontal cross-sections and then creates successive layers until the model is complete. It is a WYSIWYG process where the virtual model and the physical model are almost identical.

With additive manufacturing, the machine reads in data from a CAD drawing and lays down successive layers of liquid, powder, or sheet material, and in this way builds up the model from a series of cross sections. These layers, which correspond to the virtual cross section from the CAD model, are joined together or fused automatically to create the final shape. The primary advantage to additive fabrication is its ability to create almost any shape or geometric feature.

| Prototyping technologies | Base materials |
| --- | --- |
| Selective laser sintering (SLS) | Thermoplastics, metals powders |
| Fused deposition modeling (FDM) | Thermoplastics, eutectic metals. |
| Stereolithography (SLA) | photopolymer |
| Laminated object manufacturing (LOM) | Paper |
| Electron beam melting (EBM) | Titanium alloys |
| 3D printing (3DP) | Various materials |

Smart Network Camera

Figure 3A:
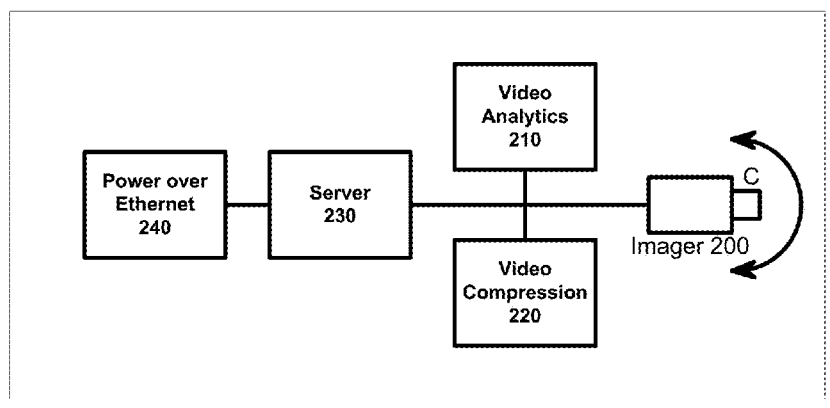
FIG. 3A is a high level block diagram of a network camera of FIG. 1.

Network camera 102 will now be described in more detail with reference to FIG. 3A. Network camera 102 includes an imager 200 (such as CCD or CMOS image sensors), a video analytics engine 210, a video compression engine 220, a server 230, and a power module with input/output interface and control 240. The module 240 can be a Power over Ethernet module that integrates power and network communication, or alternatively can be separate power and Ethernet connection. Network camera 102 includes a camera housing (not shown); and all or portions of systems 200-240 may be contained within the housing. Imager 200 may include a wide variety of units for capturing a field of view and for generating video information including digital data and analog signals. For example, imager 200 may generate information according to NTSC/PAL formats and megapixel formats. Imager 200 may include programmable imagers, high-definition imagers, no/low light sensors, and specialized imagers that are more sensitive to certain spectrums of light. Video compression engine 220 may include a scalable video codec with video compression using an advanced video standard such as H.264. Server 230 may be an SoC with external memory running an OS such as Linux. The server 230 can store video images in memory, solid state disk such as Flash, or a hard drive. The server 230 allows a remote user to retrieve the video over the network, or alternatively the server 230 can transmit video images and video metadata to the cloud storage S3 on a periodic basis. Power module 240 may include any system for receiving and distributing electrical power to various systems of network camera 102. Power may be DC power, including Power over Ethernet (PoE), or AC power. Input/output interface and control system 210 includes various hardware and software configurations to facilitate numerous types of communication including Internet; Ethernet; universal serial bus (USB); wireless; asynchronous transfer mode (ATM); Packet over SONET/SDH (POS); pan, zoom, tilt (PZT); and audio information input/output interface and control may be implemented in hardware and software to allow a user to configure operation of network camera 102.

In an alternative embodiment, a video server may be used in place of network camera 102, in which multiple imaging systems 200 capturing different fields of view are connected to video server. The video compression engine 220 may also include video encryption capabilities to prevent unauthorized viewing of video information. The video compression engine 220 may be programmable and may be capable of producing multiple quality levels of video data, including higher quality video data and lower quality video data. A quality level refers to multiple video parameters including resolution, frame rate, bit rate, and compression quality. For example, high quality video data may represent D1 resolution video recorded at 30 frames-per-second (fps) and low quality video data may represent CIF resolution video recorded at 5 fps but are not limited to the parameters above. The video compression engine 220 can generate high quality video data representing a person in the field of view while simultaneously generating a low quality video data representing background scene images of the field of view.

The video analytics engine 210 analyzes the video data produced by imager 200 to detect whether a predefined event or object of interest is being captured by imager which captures high definition video. Video analytics engine 210 generates metadata that describe the content of video data. The metadata produced by video analytics engine 210 may be a textual and semantic description of the content of the video. Video analytics engines of different network cameras 102 may have different analytic capabilities. Multiple events of interest may be defined, and more than one event of interest may occur at a particular time. Also, the nonoccurrence of one event leaves open the possibility of the occurrence of a second event. The metadata may be supplied to data storage system or the Amazon S3 web storage. The metadata representing an arbitrary frame n can be associated with video data representing frame n. Thus, the metadata may be searchable to allow a user to efficiently search and semantically browse large video archives.

An event of interest that video analytics engine 210 detects may be as simple as motion in the field of view. Video analytics engine 210 may also implement blob detection (e.g. detecting a group of moving pixels as a potential moving object, without identifying what type of object it is), lighting change adjustment, and geometric calibration based on object size in the field of view to distinguish objects based on types. For example, video analytics engine 210 may be able to classify an object as a human being, a vehicle, or another type of object and be able to recognize an object when the object appears in any portion within the field of view of network camera 102. Furthermore, video analytics engine 210 may be able to recognize certain identifiable features of an object such as, for example, human faces and vehicle license plates. Video analytics engine 210 may be able to recognize when imager 200 is capturing a new object and assign a unique object ID to the new object. Video analytics engine 210 may be able to recognize the speed and trajectory at which an object moves. Video analytics engine 210 may be able to recognize events such as perimeter intrusion, object movement in a particular direction, objects approaching one another, a number of objects located in a specified area, objects left behind, and object removal. Video analytics engine 210 can also recognize specific locations, or coordinates, within the field of view where an event or object of interest is being captured, or a combination of objects and events, as defined by a rule.

When video analytics engine 210 detects an event or object of interest within the video data, video analytics engine 210 generates metadata that correspond to the event or object of interest and supplies the metadata to an action engine, which can be rules based in one embodiment. For example, the rules can send an alert (e.g., instructions to generate one or both of a visual display and an audible sound) to central monitoring station 104 or remote user 114, store video data in Amazon S3 for X period of time, among others. For example, a user may define the following rule: when a human being enters a defined perimeter, store high resolution video data representing the intrusion, alert central monitoring station 104 of the intrusion, generate a short video clip of the intrusion and send the video clip to central monitoring station 104, and store in the Web storage S3 the video data representing the intrusion. Or, a user may define the following rule: when no event or object of interest is being captured, store low resolution video data and send no video data to central monitoring station 104. Because video analytics engine 210 can detect various objects and events, a wide variety of rules may be defined by a user and each rule can have different storage quality settings. Also, because multiple events of interest may occur simultaneously, a rule may correspond to a combination of events.

The video compression engine 120 can be a scalable video codec to generate multiple quality levels using H.264 SVC. For example, network camera 102 initially generates high resolution video data and subsequently, the quality level of portions of the video data that represent the non-occurrence of an event of interest are saved in low resolution to save storage space. Storage capacity needs can be reduced even for applications that require substantially continuous operation of network camera 102. For example, when an event of interest is captured, the content aware storage system can record the event at a high resolution level. When an event of interest is not being captured, the content aware storage system can record the video data at a low resolution level. The quality level of stored data, therefore, can be matched to the importance of the content.

In operation, imager 200 captures a field of view and generates video data. Frames of the video data are time-stamped so that metadata generated by video analytics engine 210 may be synchronized with video data generated by imager 200. Video analytics engine 210 analyzes the video data generated by imager 200 and generates metadata based upon the content of the video data. The video compression engine 220 also receives the video data generated by imager 200 and generates scalable video data that can be subsequently be saved at differing resolution. The metadata is communicated to the server to determine whether a rule has been violated (i.e., whether an event or object of interest detected by video analytics engine 210 requires action).

Figure 3B:
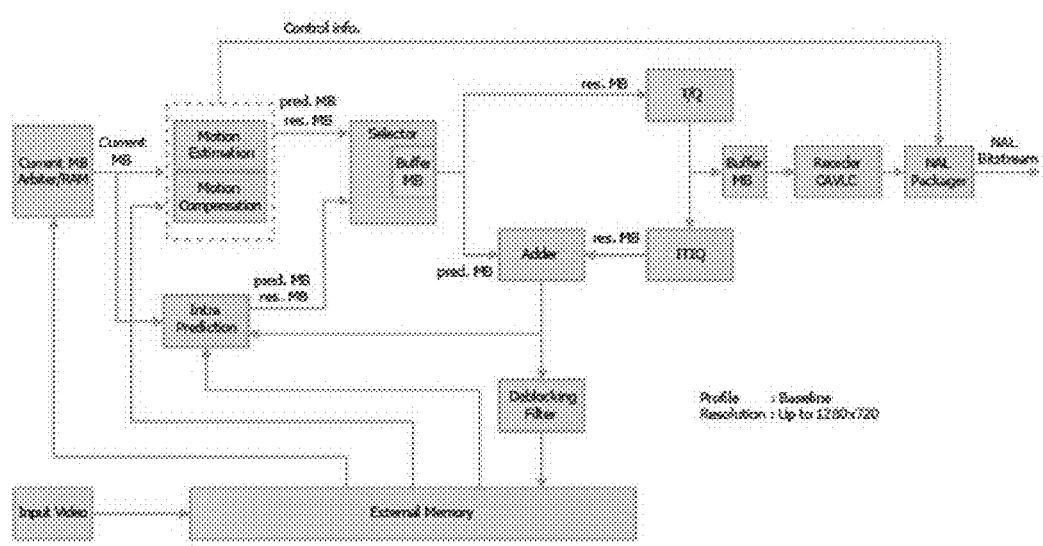
FIGS. 3B, 3C and 3D show various exemplary advanced video coding systems in FIG. 3A.
Figure 3C:
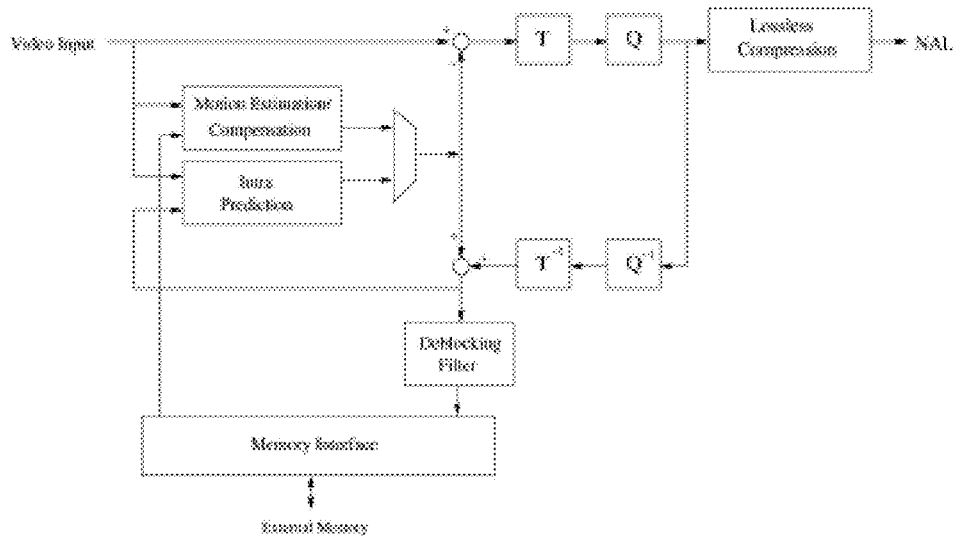

Referring now to exemplary H.264 encoder cores shown in FIGS. 3B-3C, the initial step is the generation of a prediction. The baseline H.264 encoder uses two kinds of prediction: intra prediction (generated from pixels already encoded in the current frame) and inter prediction (generated from pixels encoded in the previous frames).

A residual is then calculated by performing the difference between the current block and the prediction. The prediction selected is the one that minimizes the energy of the residual in an optimization process that is quite computationally intensive.

A linear transform is then applied to the residual. Two linear transforms are used: Hadamard and a transform derived from the discrete cosine transform (DCT). The coefficients resulting from the transformations are then quantized, and subsequently encoded into Network Abstraction Layer (NAL) units. These NALs include context information—such as the type of prediction—that is required to reconstruct the pixel data. The NAL units represent the output of the baseline H.264 encoding process.

Meanwhile, inverse quantization and transform are applied to the quantized coefficients. The result is added to the prediction, and a macroblock is reconstructed. An optional deblocking filter is applied to the reconstructed macroblocks to reduce compression artifacts in the output. The reconstructed macroblock is stored for use in future intra prediction and inter prediction. Intra prediction is generated from unfiltered reconstructed macroblocks, while inter prediction is generated from reconstructed macroblocks that are filtered or unfiltered.

Intra prediction is formed from pixels that were previously encoded. Two kinds of intra predictions are used: intra16×16 and intra4×4. In intra16×16, all the pixels already encoded at the boundary with the current block can be used to generate a prediction. These are shown shaded in the figure below. The core can generate the four modes of the intra16×16 prediction. In intra4×4, 16 4×4 blocks of prediction are generated from the pixels at the boundaries of each 4×4 prediction block and boundary pixels are used in intra16×16 and intra4×4 intra prediction modes.

The inter prediction is generated from motion estimation. At the heart of video compression, motion estimation is used to exploit the temporal redundancy present in natural video sequences. Motion estimation is performed by searching for a 16×16 area of pixels in a previously encoded frame so that the energy of the residual (difference) between the current block and the selected area is minimized.

The core can search an area 32×32 pixels wide, down to ¼ pixel of resolution (−16.00, +15.75 in both X and Y direction). Pixels at ¼ resolution are generated with a complex interpolation filter described in the ITU-T H.264 specification.

The Hadamard transform and an integer transform derived from the DCT and their descriptions can be found in the ITU-T H.264 standard, the content of which is incorporated by reference. Both transforms (and their inverse functions) can be performed by using only additions, subtractions and shift operations. Both quantization and its inverse are also relatively simple and are implemented with multiplication and shifts.

H.264 encoding can be essentially divided into two independent processes: motion estimation and compensation, and variable length encoding. The motion estimation sub-module of the core consists of two stages: integer pixel motion estimation followed by a refining step that searches for matches down to ¼ pixel resolution. The integer search unit utilizes a 4 step search and sums of absolute difference (SAD) process to estimate the motion vector. Similar to the case of motion estimation, SADs are used to search for the intra prediction mode that best matches the current block of pixels.

The resultant bitstream is assembled into NAL units and output in byte stream format as specified in Annex B of the ITU-T H.264 specification. Each NAL unit contains context information about the type of prediction, motion vectors, Quantisation Parameter delta, and the Context Adaptive Variable Length Coded (CAVLC) luma and chroma coefficients. Most of the encoded bits in each macroblock are devoted to the CAVLC coefficients. CAVLC coding operates on 4×4 blocks and scans the coefficients in zig-zag order. Each 4×4 block comprises the following elements:
- the number of non-zero coefficients
- number of trailing ones (up to 3)
- sign of each trailing one (up to 3)
- the level code of each non-zero coefficient
- the zero run code preceding each non-zero coefficient For high definition video, the core requires an external memory, whose interface can be easily interfaced to the AMBA AHB with a minimal amount of extra logic. The interface is also designed to be tolerant of latencies and delays typical of a shared bus. The external memory is likely to be, in many cases, a type of SDRAM rather than SRAM. One of the characteristics of SDRAM is for the memory to behave essentially like a SRAM provided that accesses are confined within a page. Only when crossing a page boundary will the penalty of extra cycles be incurred due to a precharge. Therefore the core sorts all its memory accesses in a way that minimizes page boundary crossings, achieving performance closer to one that would be obtained if it was connected to SRAM. The memory controller can postpone precharging as long as accesses are confined to the same page. Additionally, the external memory interface can be clocked at a different frequency from the main core. Other features include block skipping for lower bit count and multiple slice encoding for error resilience. A deblocking filter is also used in order to improve image quality at low bit rates.

Figure 3D:
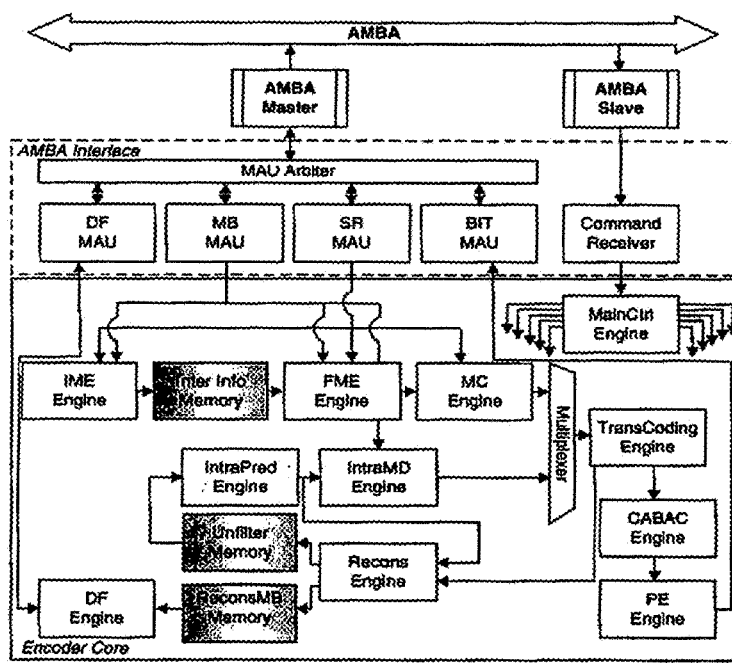

FIG. 3D shows another high definition H.264 encoder with a parallel-processing architecture. The encoder of FIG. 3D is an application-specific VLSI architecture for H.264/AVC video encoding. The architecture is discussed in Youn-Long Steve Lin et al's book VLSI Design for Video Coding: H.264/AVC Encoding from Standard Specification to Chip, published by Springer; 1st Edition (Dec. 1, 2009), the content of which is incorporated by reference.

Figure 3E:
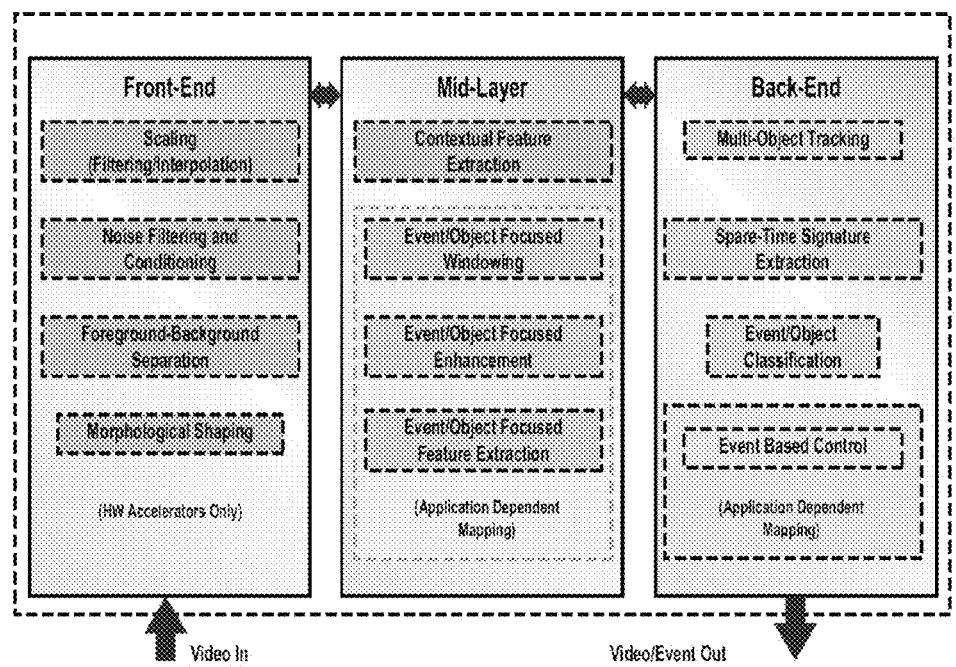
FIG. 3E shows an exemplary video analytic engine of FIG. 3A.

FIG. 3E shows an exemplary video analytics sub-system implemented as an FPGA or ASIC. The VA engine includes a plurality of engines, including an engine to perform image flow, up/down scaling and windowing; an engine to perform image flow conditioning and noise filtering, including gain control and contrast modification; an engine to perform foreground-background separation; an engine to perform binary morphological filtering, with size classification and contour-structure shaping; an engine to perform multi-event/object signature and/or feature extraction; and an engine to perform event/object-focused enhancement. To provide better performance, an engine to perform application-specific event/object-based control is also provided. The above engines are implemented in hardware for speed reasons. In FIG. 3E, the front-end and the mid layers are accelerated by hardware. The back-end operations such as multi-object tracking and event/object classification are done on a processor or DSP for flexibility.

These engines can be used to flexibly create a multithread coprocessor pipeline for demanding image flow processing. The IP cores can be deployed in almost arbitrary order and configured during the design and customization of various analytics engines.

Figure 3F:
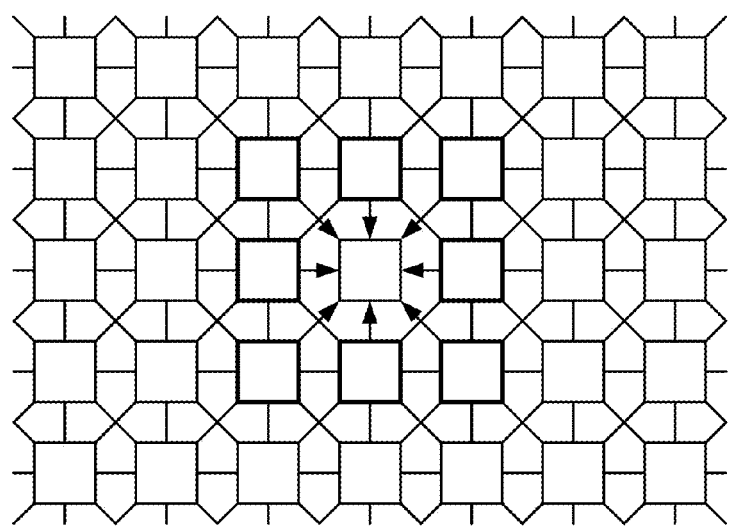
FIG. 3F shows an exemplary CNN video analytic engine.

FIG. 3F shows an exemplary Cellular Neural Network (CNN) suitable for image processing. Cellular arrays are usually defined on a spatially discrete square (rectangular) grid; however, hexagonal and triangular arrangements can also be considered. These grids are the only regular contiguous tessellations of the plain based on congruent polygons alone. Other grid-types can also be created based on non-regular congruent polygons or from a regular vertex grid through discrete geometrical transformations: rotations and translations. A number of these grids can be mapped on a typical eight-neighbor rectangular structure with periodic space-variant connections.

Figure 3G:
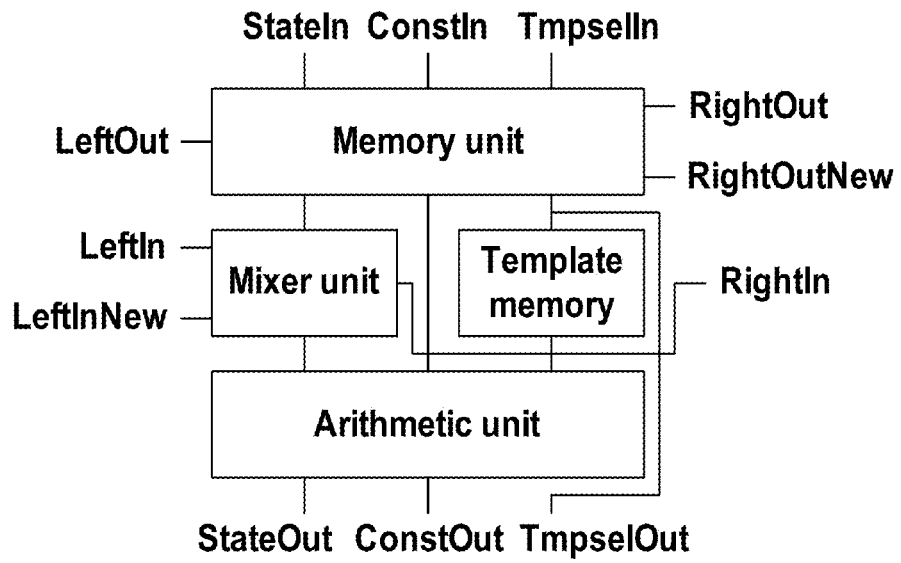
FIGS. 3G-3M show various exemplary implementations of the CNN engine of FIG. 3F.
Figure 3H:
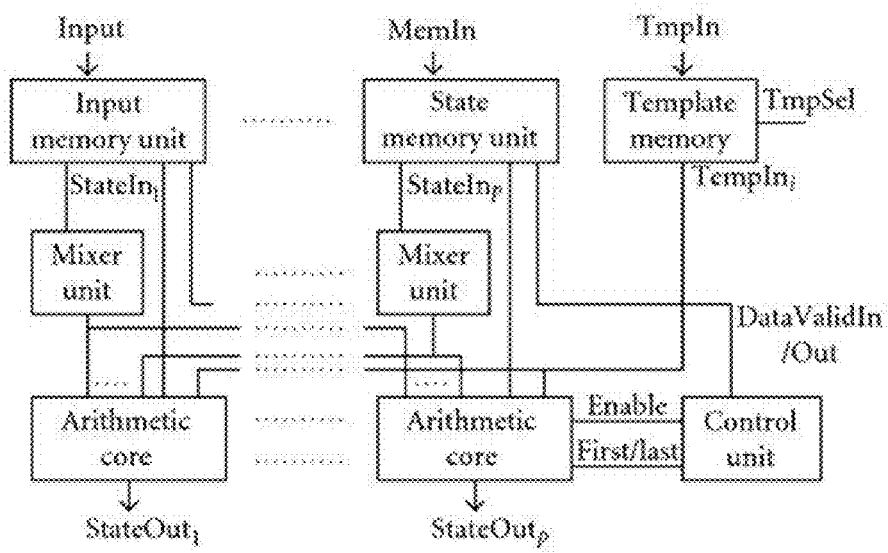

FIGS. 3G-3H shows an exemplary digital CNN. The CNN has a mixer which contains cell values for the next updates, a memory unit that contains a belt of the cell array, a template memory, and an arithmetic unit. The processors can be connected on a grid. Depending on the template size, each mixer unit stores the surrounding cells of the currently processed one, while the memory units store a one or two row-high belt from the given layer. Using this structure the I/O requirements of the processor are reduced to p load and p store operations per cell update. The optimized template memory contains only the parameters which are necessary to perform the computations, while the modified arithmetic units make efficient computation of the different type multilayer dynamics possible.

Figure 3I:
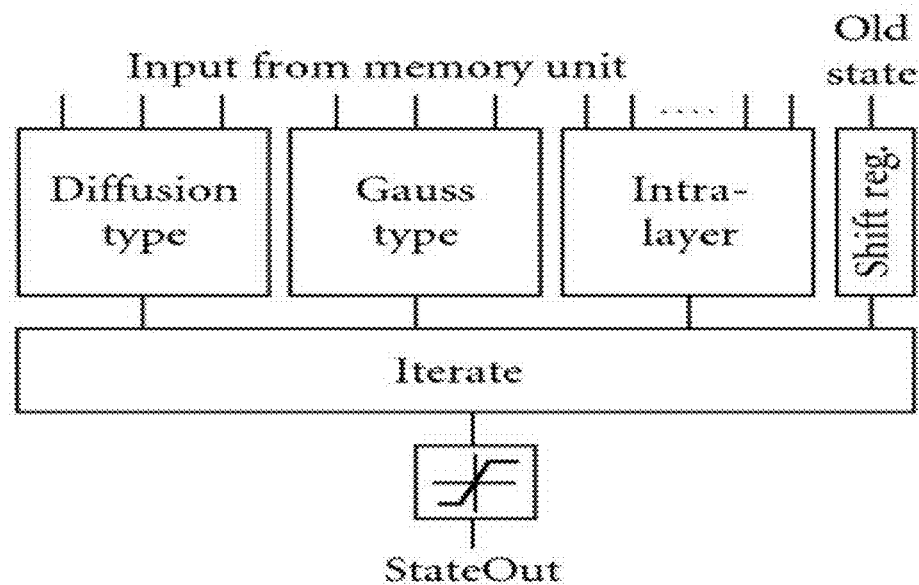
Figure 3J:
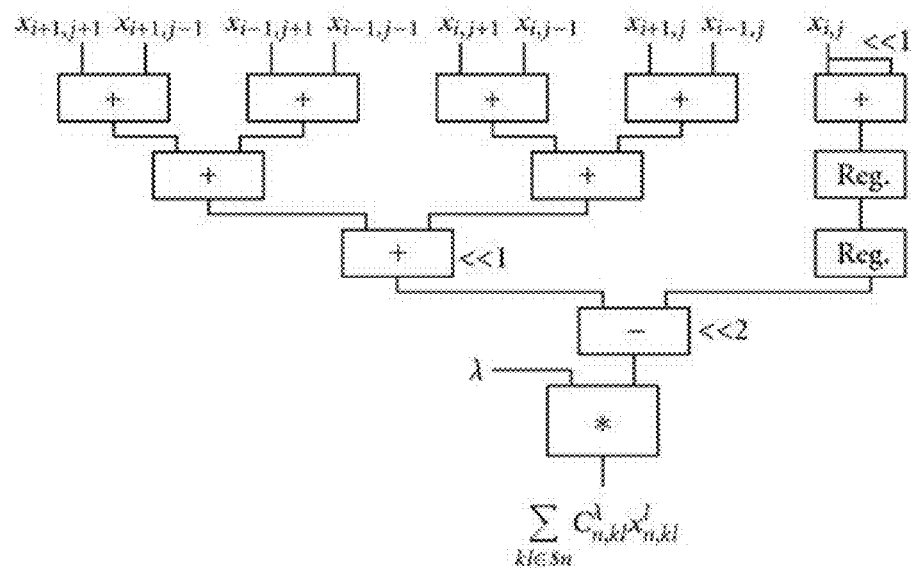
Figure 3K:
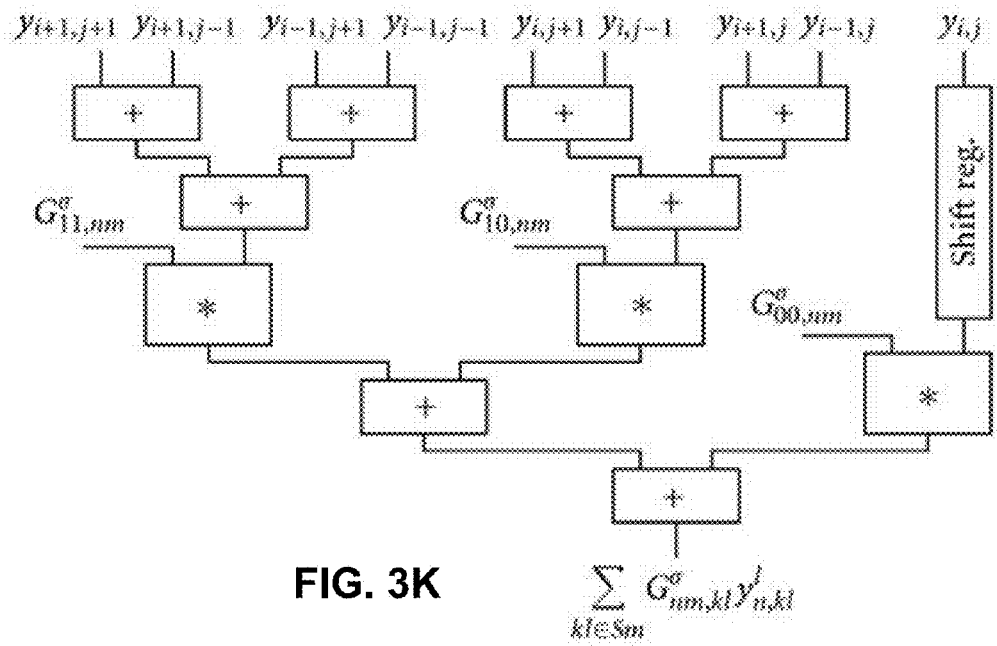
Figure 3L:
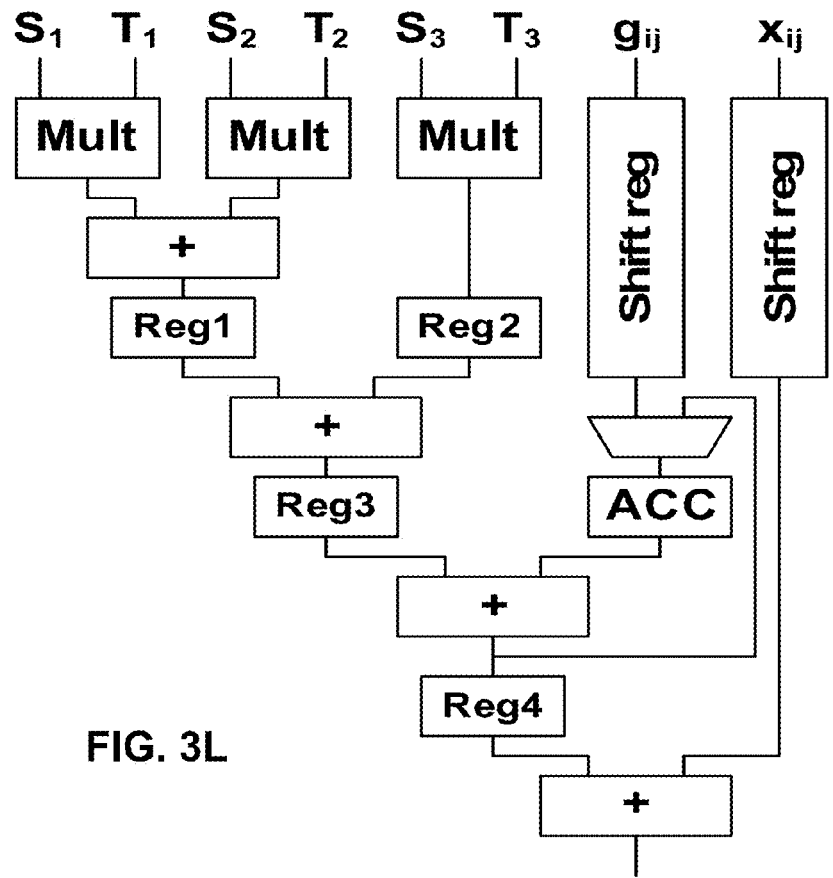

FIG. 3L shows an ALU for the processor of FIG. 3G, while a block level structure of the arithmetic unit for the processor of FIG. 3H is shown in FIG. 3I. To reduce the clock cycle time of the arithmetic unit, pipeline technique is used. The computation of the derivatives can be divided into the following three parts: (i) computation with the zero neighborhood (intra- and interlayer) connections, (ii) computation with the diffusion-type template, and (iii) computation with the Gauss-type templates. Each layer has a separated and optimized arithmetic core which is connected to the mixer and memory units of the other layers according to the existing connections between the layers. The simplest element of the arithmetic unit is the intralayer block, which computes the inter- and intralayer zero neighborhood connections. This unit contains one multiplier for each connection, and the multiplied values are summed by an adder tree.

FIG. 3J shows the structure of the optimized arithmetic unit to compute the diffusion-type template (pipeline registers are not shown for simplicity). Due to the symmetry properties of the diffusion-type template, the computation can be performed by the optimized circuit shown in FIG. 3J.

Multiplication with 2 and −12 is carried out by shifting operations and only one multiplier is required to compute the 3×3 template operation. This solution reduces the number of required multipliers from 3 to 1. Additionally, the number of clock cycles required to compute a new value is also reduced from 3 to 1 clock cycle, which significantly increases the computing performance of the processor.

FIG. 3K shows an optimized arithmetic unit to compute the Gauss-type template (pipeline registers are not shown for simplicity). The Gaussian template is also symmetrical but the ratio of the coefficient values is not an integer number. Therefore, at first the equally weighted state values are summed then these partial results are multiplied; finally the multiplied values are summed again. By using this optimized circuit shown in FIG. 3K, the number of multipliers is still three but the length of the computation cycle is reduced to one clock cycle.

Figure 3M:
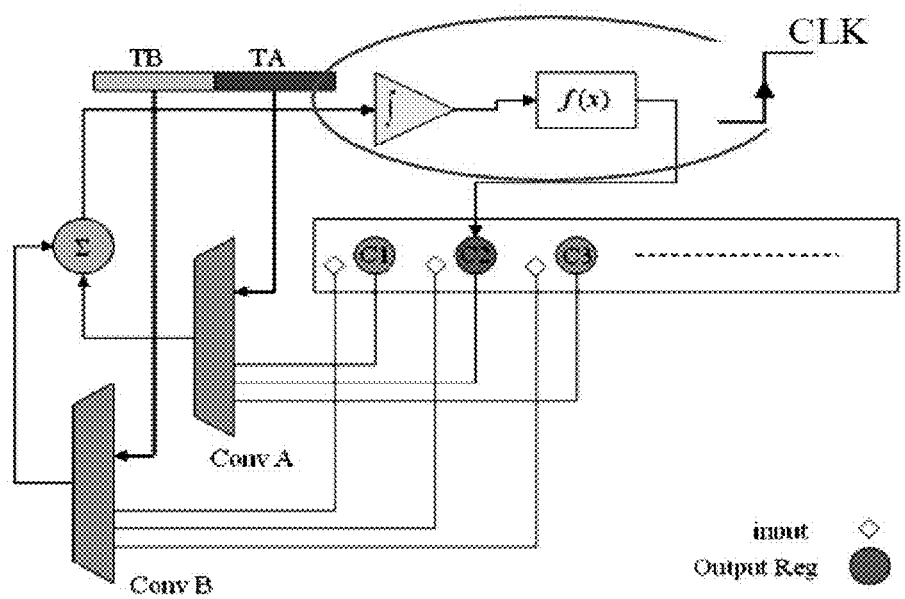

FIG. 3M shows another exemplary Cellular Neural Network (CNN) suitable for image processing. This system is a reduced version of a Hopfield Neural Network. The local connections between a cell and the neighbors in this implementation of this technology are easier than in the case of Hopfield Neural Networks.

Other main important units for developing the CNN are the integrator and linear sigmoid function. To implement an integrator in HDL a register is used. The integrator unit sums the result in each new cycle with previous values of the register.

According to the length of M0 and M1, the length of the integrator register should be 32 bit. The following code below is obtained after synthesis and is like an 8 integrator that works concurrently.

```
always @(posedge clk)
begin
    for (j=0;j<=7;j=j+1)
    begin
        res[j] = S2[j];
    end
```

The term of S2 is the sum of C(TA,Y) and C(TB,U) from the previous cycle.

A sigmoid function can be implemented as an if-then rule. The following code below shows the way this unit operates. "Greater than values" will be limited by this procedure between +1 and −1.

```
for (j=0;j<=7;j=j+1)
begin
    if (res[j]>32'sh00000_000) // > 0
    begin
        Y[j]=16'h1_000; // +1
        res[j]=32'h00001_000;
    end
    if (res[j]==32'sh00000_000) // = 0
    begin
        Y[j]=16'h0_000; // 0
        res[j]=32'h00000_000;
    end
    if (res[j]<32'sh00000_000) // < 0
    begin
        Y[j]=16'hf_000; // −1
        res[j]=32'hfffff_000;
    end
End
```

In these units the "res" vector is a temporary register for simulating the integrator and "Y" variable is a memory for storing CNN output state.

The convolution for feedback and control templates are as follows:

```
// 1x3 Convolution Module
module conv2 (conv,VA1,VA2,VA3,Y1,Y2,Y3);
output [17:0] conv; //17
input [15:0]VA1;
input [15:0]VA2;
input [15:0]VA3;
input [15:0]Y1;
input [15:0]Y2;
input [15:0]Y3;
wire signed [17:0] conv;
wire signed [15:0] out1;
wire signed [15:0] out2;
wire signed [15:0] out3;
signe_mul MUL1(out1,VA1,Y1);
signe_mul MUL2(out2,VA2,Y2);
signe_mul MUL3(out3,VA3,Y3);
assign conv = out1+out2+out3;
endmodule
```

-continued

```
// resule range [−7,+7] accuracy 12bit Fixed Float
module signe_mul (out,a,b);
output [15:0] out;
input [15:0] a;
input [15:0] b;
wire signed [15:0] out;
wire signed [31:0] mul_out;
assign mul_out = a*b;
assign out = {mul_out[31],mul_out[26:12]};
endmodule
```

Figure 4:
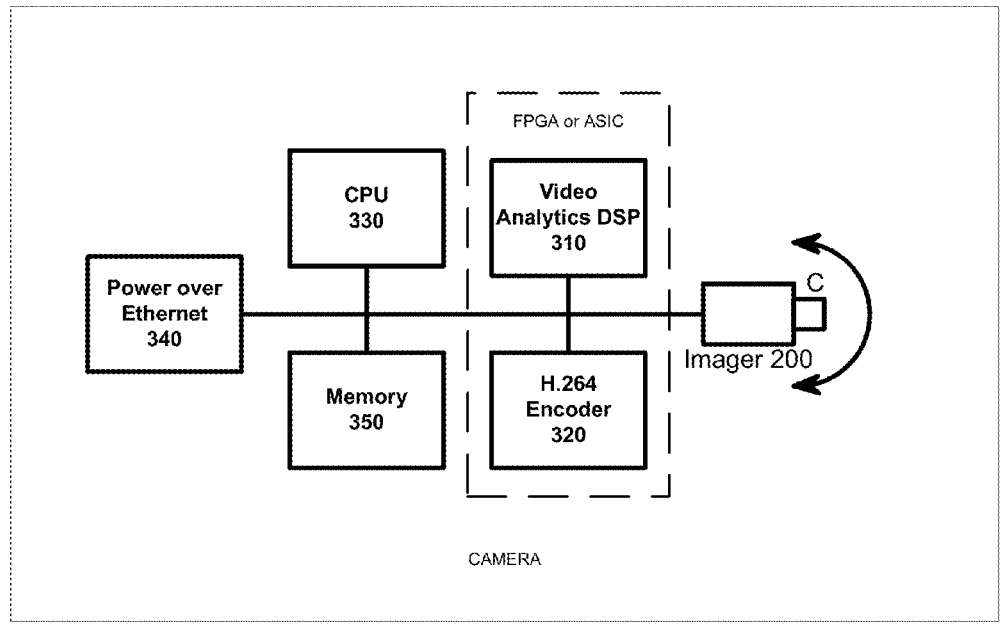
FIG. 4 shows an embodiment of a camera with FPGA or ASIC engines therein.

FIG. 4 shows a second exemplary implementation of the camera. The output from imager (CMOS or CCD) 200 is digitized and provided to an FPGA or ASIC device that has two portions: video analytics DSP 310 and H.264 encoder 320. The encoder 320 and a CPU 330 can share memory 350. The data can be transmitted over Ethernet and power can be supplied by a power over Ethernet (PoE) chip 340. The system of FIG. 3 is cost effective and provides high performance. The FPGA version provides field upgradability. In one embodiment, the CPU 330, DSP 310 and encoder 320 are in one single ASIC. In another embodiment, the CPU 330 is a separate IC, while the DSP 310 and encoder 320 are in an FPGA. Any combinations of ASIC and FPGA can be done as well.

Figure 5A:
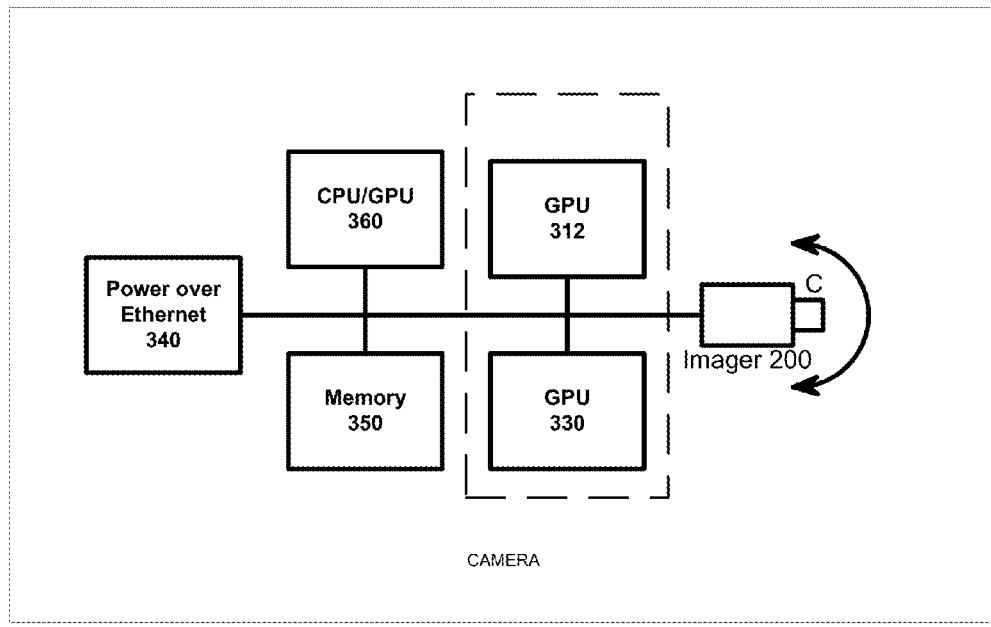
Figure 5B:
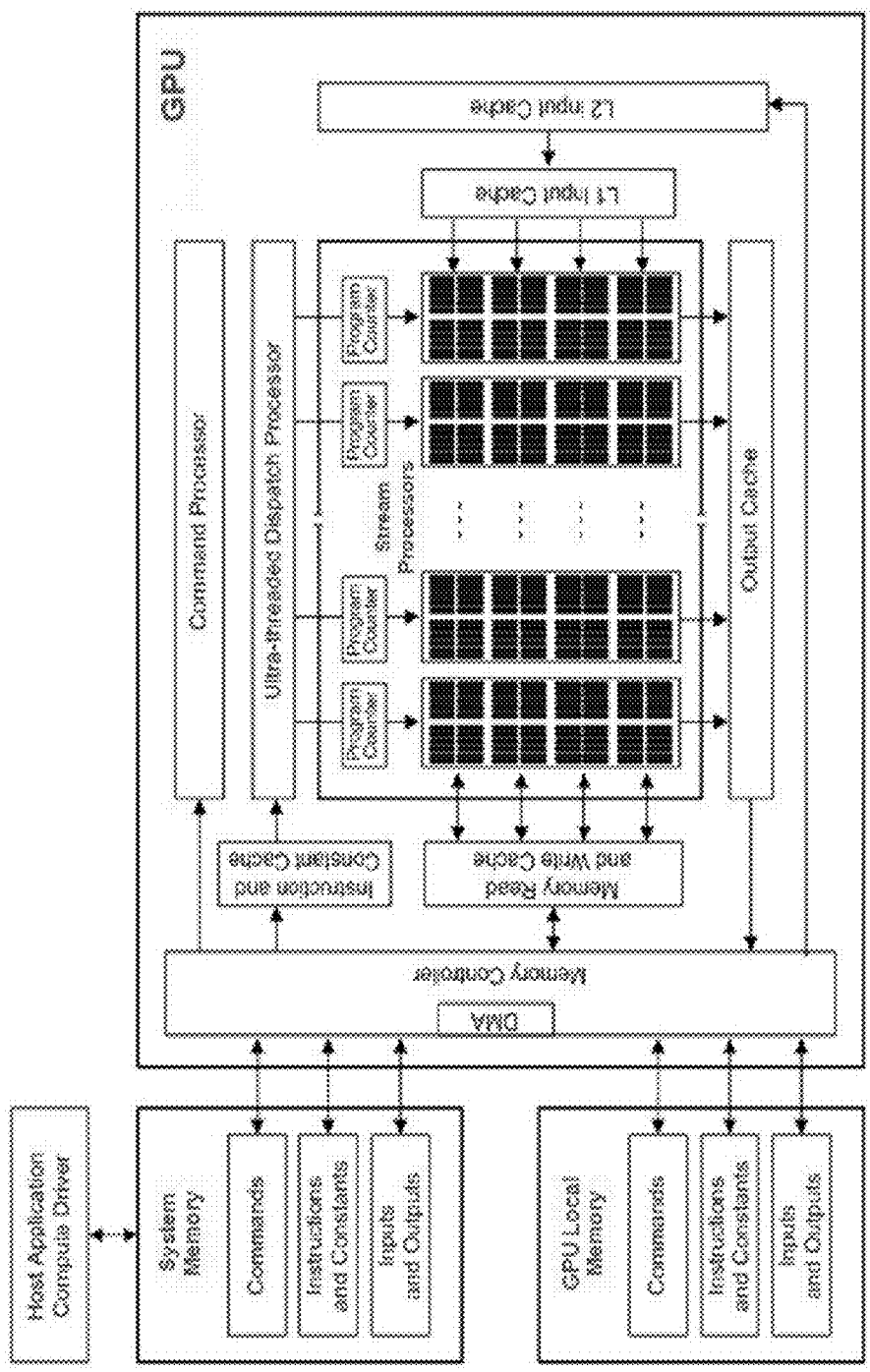
FIG. 5B shows details of an exemplary GPU engine.

FIG. 5 shows a third implementation of the camera. The output from imager (CMOS or CCD) 200 is digitized and provided to a CPU/GPU (graphic processing unit) device 360 where the parallel processes used to produce graphics imagery by the GPU are used instead to perform arithmetic calculations.

Additionally, one or more GPUs 312 and 330 can communicate with the CPU 360 over a bus such as PCIe bus to offload processing work from the CPU 360. The GPUs, working in concert with the system's CPUs accelerate enabled applications beyond traditional graphics and video processing. This enables balanced platforms to run computationally-intensive tasks more efficiently, providing a better application experience to the end user. The imager 200, the memory 350, and PoE 340 can communicate over the bus as well.

The system of FIG. 5 provides high performance and field upgradability. In one embodiment, the CPU and GPUs are in one single IC device with a heterogeneous multicore microprocessor architecture, combining a general purpose processing core(s) and basic graphics core(s) into one processor package, with different clocks for the graphics core and the central processing core. In this embodiment, AMD's Fusion series processor includes on-chip graphics core that can be changed without re-design of the whole core. In this embodiment, hardware decoders of MPEG2, VC-1 and H.264 video streams are included, while H.264 encoding is done on the GPUs with supported software. In another embodiment, the CPU 360 is a separate IC, while the GPUs are in a separate IC. Any combinations of CPU, GPU and FPGA can be done as well.

The implementation of FIG. 5 uses GPUs such as those in video cards which are designed to perform fast execution of integer and floating-point arithmetic. This capability enables the video adapter to quickly compute color, shading, texture, and other aspects of a changing image and render these in real time to the screen—thereby creating lifelike multimedia experiences. On many PCs, especially business PCs, much of this capability remains unused because business graphics only rarely need these full-bore advanced video capabilities, which means that the GPU and related hardware are available to be harnessed for non-video computation such as stream computing. Stream computing (or stream processing) refers to a class of compute problems, applications or tasks that can be broken down into parallel, identical operations and run simultaneously on a single processor device. These parallel data streams entering the processor device, computations taking place and the output from the device define stream computing. Stream computing takes advantage of a SIMD methodology (single instruction, multiple data) whereas a CPU is a modified SISD methodology (single instruction, single data); modifications taking various parallelism techniques into account. The benefit of stream computing stems from the highly parallel architecture of the GPU whereby tens to hundreds of parallel operations are performed with each clock cycle whereas the CPU can work only a small handful of parallel operations per clock cycle.

Figure 5C:
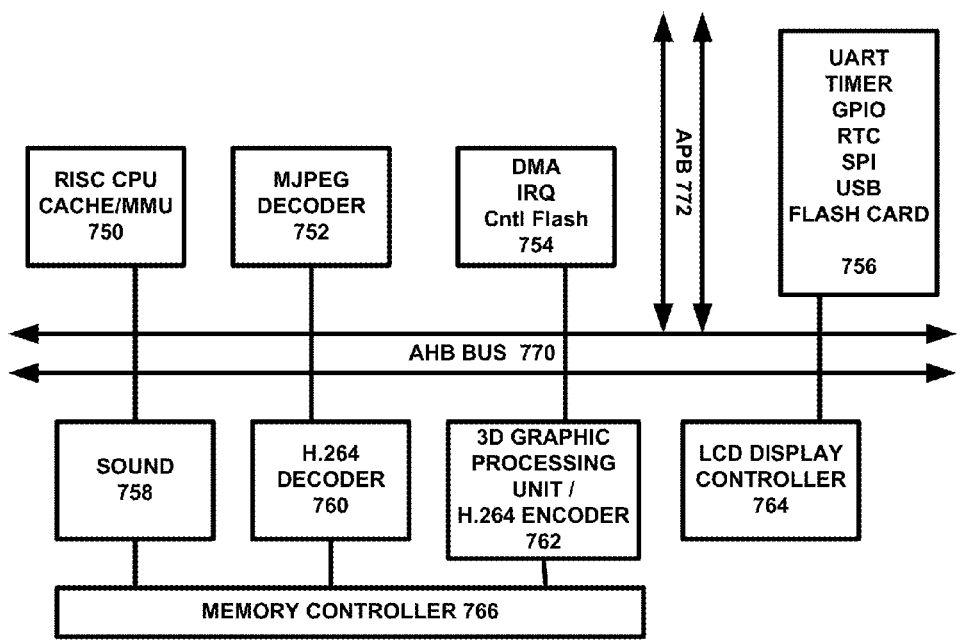
FIG. 5C shows an exemplary multimedia processor.

FIG. 5C shows an exemplary multimedia processor that can handle H.264 encoding as well as being a 3D graphics controller for handheld devices such as cellular telephones or gaming devices, among others. The device is a super integrated SoC (System On a Chip) aimed at providing high performance multimedia functionality and low power consumption for Personal Multimedia Digital Assistance. The device incorporates 32 bit CPU processor with integrated DSP support, H.264 Decoder, JPEG Decoder, 2D Graphic engine, Sound Mixer, CRT controller with OSD, Video Encoder, Video Decoder Interface Module, USB Host/Device and I/O peripheral components. EAGLE can reduce system cost significantly through eliminating not only system control CPU, but also graphic IC, Sound IC and Video Encoder as well as USB. EAGLE helps system designer reduce its engineering effort and time in developing a new system by adding only memory and I/O devices such as LCD panel, Flash, among others. This device is optimized for multimedia player, portable karaoke, portable and arcade game.

One embodiment features a 32 bit Processor Core 750 based On EISC Instruction Set Architecture providing High Performance Integer Processing Core with DSP Capabilities-5-Stage Pipelining, Harvard Architecture, 16 General Purpose Registers (GPR) and 9 Special Purpose Registers (SPR). An MJPEG decoder 752 is connected over an AHB bus 770. DMA controller 754 also communicates over the AHB bus 770. A UART/timer/GPIO/RTC/SPI/USB and flash card interface unit 756 is provided. A sound controller 758, an H.264 decoder 760 is provided to provide high performance playing of H264 video streams. A 3D graphic processing unit (GPU) 762 can render 3D graphics for gaming and can also be used to encode H.264 video streams. An LCD display controller 726 can drive an LCD or suitable display. The device of FIG. 5C supports AMBA 2.0. The AHB Master On-Chip Cache Controller provides Separated On-Chip Instruction/Data Cache4-way Set Associative, 8 KByte Instruction Cache, 8 KByte Data Cache On-Chip Memory Management Unit Memory Protection Capabilities Based on Memory Bank and Sub-banking Scheme Separated On-Chip Instruction/Data TLB, 4-Way Set Associative, 128-Entry DSP function Saturated Add, Average, Sum of Product, PackShift/Rotate, ABS, Min/MaxAddress Unit-Next Address, Reverse Address, Auto address32 bit signed/unsigned multiply32 bit signed multiply and accumulate capabilities.

The CRT Controller 726 supports VGA, TFT LCD and NTSC/PAL Display Monitor and supports high display resolution. It supports VESA DPMS for VGA monitor-Horizontal and Vertical double scan control-Serialization RGB data and 256×32 FIFO controls in CRTC block-Gun Interface Video Signal Processing-Support External Video Sync.

Figure 6:
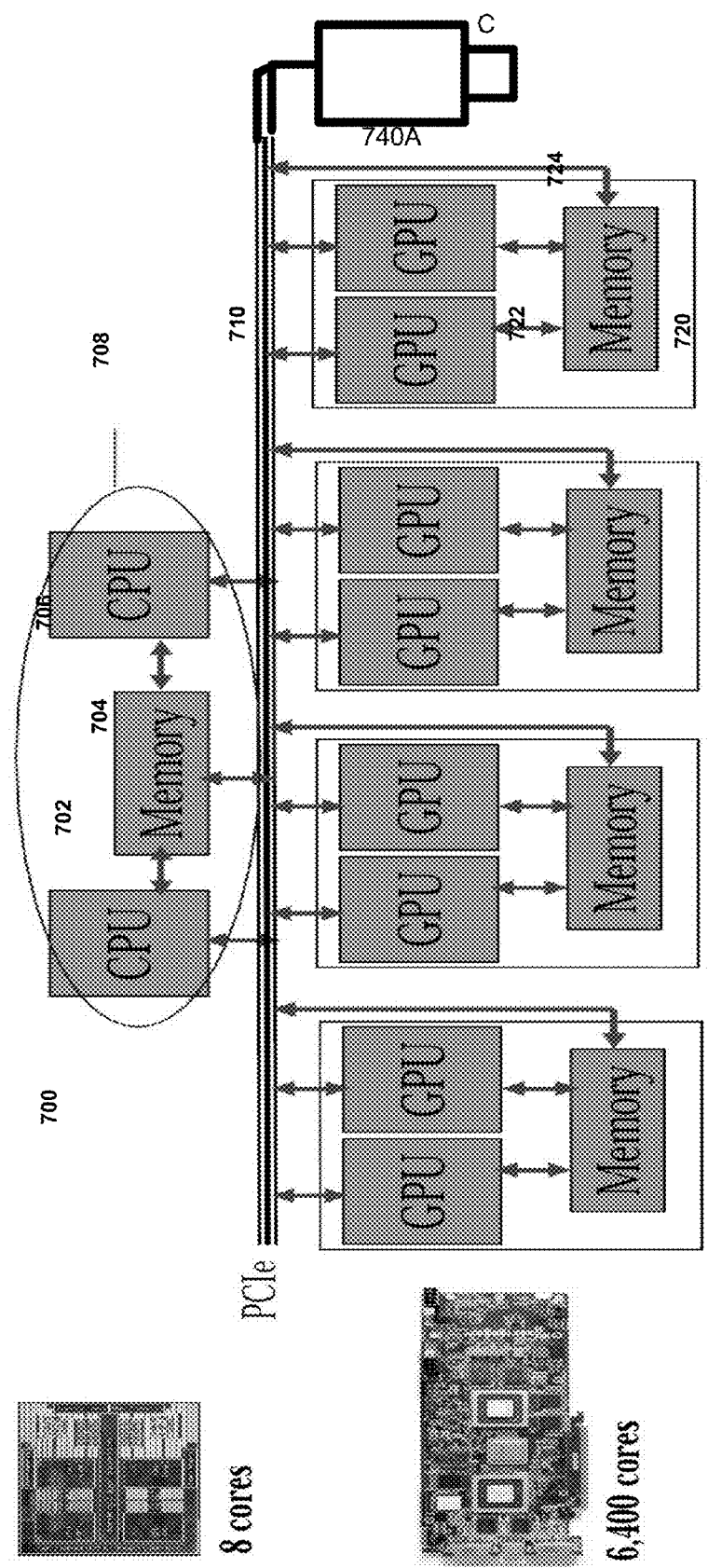
FIGS. 6-7 shows GPUs with one or more cameras attached to the GPUs.

FIG. 6 shows one embodiment of GPU based camera 700. In FIG. 6, a multi-core processor 708 includes CPUs 702 and 706 with shared memory 704. The processor 708 communicates over a PCIe bus 710 with one or more graphics chips 720 which includes a plurality of GPUs 722 communicating with shared memory 724. A camera 740A also communicates over the PCIe bus 710.

Figure 7:
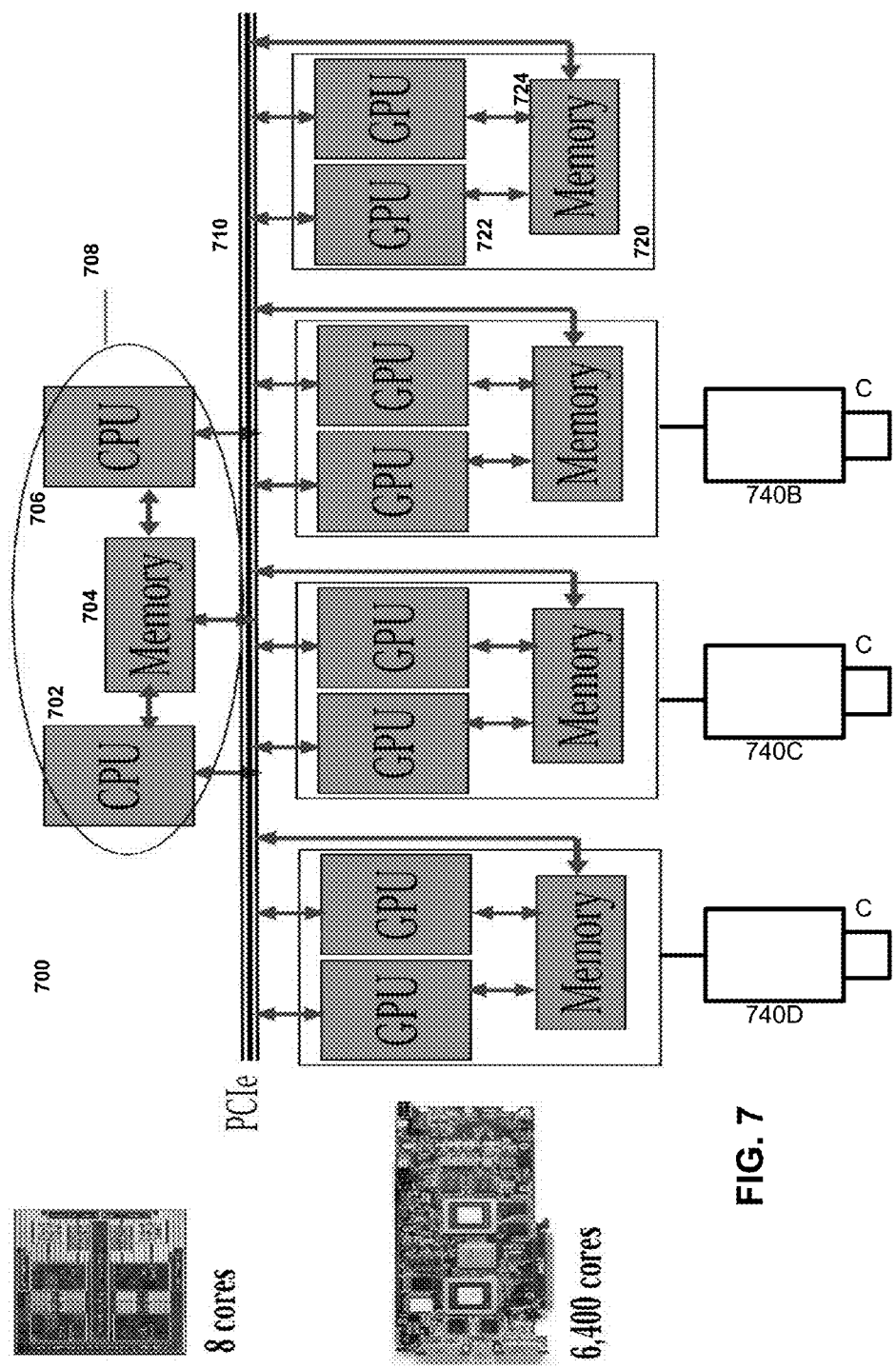

FIG. 7 shows another GPU camera embodiment of FIG. 6. In this embodiment, each of three cameras 740B, 740C and 740D is connected to a GPU device and the GPU device 720 in turn performs video analytics and/or encoder operations on the video captured by the camera. The system of FIG. 7 scalably handles a number of cameras in parallel, while keeping overhead costs low.

In one embodiment with two or more cameras, camera parameters (e.g. field of view) are preset to fixed numbers. Each pixel from each camera maps to a cone space. The system identifies one or more 3D feature points (such as a birthmark or an identifiable body landmark) on the patient. The 3D feature point can be detected by identifying the same point from two or more different angles. By determining the intersection for the two or more cones, the system determines the position of the feature point. The above process can be extended to certain feature curves and surfaces, e.g. straight lines, arcs; flat surfaces, cylindrical surfaces. Thus, the system can detect curves if a feature curve is known as a straight line or arc. Additionally, the system can detect surfaces if a feature surface is known as a flat or cylindrical surface. The further the patient is from the camera, the lower the accuracy of the feature point determination. Also, the presence of more cameras would lead to more correlation data for increased accuracy in feature point determination. When correlated feature points, curves and surfaces are detected, the remaining surfaces are detected by texture matching and shading changes. Predetermined constraints are applied based on silhouette curves from different views. A different constraint can be applied when one part of the patient is occluded by another object. Further, as the system knows what basic organic shape it is detecting, the basic profile can be applied and adjusted in the process.

In a single camera embodiment, the 3D feature point (e.g. a birth mark) can be detected if the system can identify the same point from two frames. The relative motion from the two frames should be small but detectable. Other features curves and surfaces will be detected correspondingly, but can be tessellated or sampled to generate more feature points. A transformation matrix is calculated between a set of feature points from the first frame to a set of feature points from the second frame. When correlated feature points, curves and surfaces are detected, the rest of the surfaces will be detected by texture matching and shading changes.

Each camera exists in a sphere coordinate system where the sphere origin (0, 0, 0) is defined as the position of the camera. The system detects theta and phi for each observed object, but not the radius or size of the object. The radius is approximated by detecting the size of known objects and scaling the size of known objects to the object whose size is to be determined. For example, to detect the position of a ball that is 10 cm in radius, the system detects the ball and scales other features based on the known ball size. For human, features that are known in advance include head size and leg length, among others. Surface texture can also be detected, but the light and shade information from different camera views is removed. In either single or multiple camera embodiments, depending on frame rate and picture resolution, certain undetected areas such as holes can exist. For example, if the patient yawns, the patient's mouth can appear as a hole in an image. For 3D modeling purposes, the hole can be filled by blending neighborhood surfaces. The blended surfaces are behind the visible line.

In one embodiment, each camera is calibrated before 3D detection is done. Pseudo-code for one implementation of a camera calibration process is as follows:

Place a calibration sheet with known dots at a known distance (e.g. 1 meter), and perpendicular to a camera view.

Take snap shot of the sheet, and correlate the position of the dots to the camera image:

$$Dot1(x,y,1) \leftrightarrow pixel(x,y)$$

Place a different calibration sheet that contains known dots at another different known distance (e.g. 2 meters), and perpendicular to camera view.

Take another snapshot of the sheet, and correlate the position of the dots to the camera image:

$$Dot2(x,y,2) \leftrightarrow pixel(x,y)$$

Smooth the dots and pixels to minimize digitization errors. By smoothing the map using a global map function, step errors will be eliminated and each pixel will be mapped to a cone space.

For each pixel, draw a line from Dot1(x, y, z) to Dot2(x, y, z) defining a cone center where the camera can view.

One smoothing method is to apply a weighted filter for Dot1 and Dot2. A weight filter can be used. In one example, the following exemplary filter is applied.

```
121
242
121
```

Assuming Dot1_Left refers to the value of the dot on the left side of Dot1 and Dot1_Right refers to the value of the dot to the right of Dot1 and Dot1_Upper refers to the dot above Dot1, for example, the resulting smoothed Dot1 value is as follows:

```
1/16 * ( Dot1 * 4 + Dot1_Left * 2 + Dot1_Right *2 + Dot1_Upper *2
+
Dot1_Down *2 + Dot1_UpperLeft + Dot1_UpperRight +
Dot1_LowerLeft + Dot1_LowerRight)
```

Similarly, the resulting smoothed Dot2 value is as follows:

```
1/16 * ( Dot2 * 4 + Dot2_Left * 2 + Dot2_Right *2 + Dot2_Upper
*2 + Dot2_Down *2 + Dot2_UpperLeft + Dot2_UpperRight +
Dot2_LowerLeft + Dot2_LowerRight)
```

In another smoothing method, features from Dot1 sheet are mapped to a sub pixel level and features of Dot2 sheet are mapped to a sub pixel level and smooth them. To illustrate, Dot1 dot center (5, 5, 1) are mapped to pixel (1.05, 2.86), and Dot2 dot center (10, 10, 2) are mapped to pixel (1.15, 2.76). A predetermined correlation function is then applied.

An exemplary calibration sheet having a plurality of dots can be used. In this embodiment, the dots can be circular dots and square dots which are interleaved among each others. The dots should be placed relatively close to each other and each dot size should not be too large, so we can have as many dots as possible in one snapshot. However, the dots should not be placed too close to each other and the dot size should not be too small, so they are not identifiable.

The camera can monitor patient activity and generates a warning if the patient has fallen. In one implementation, the system detects the speed of center of mass movement. If the center of mass movement is zero for a predetermined period, the patient is either sleeping or unconscious. The system then attempts to signal the patient and receive confirmatory signals indicating that the patient is conscious. If patient does not confirm, then the system generates an alarm. For example, if the patient has fallen, the system would generate an alarm signal that can be sent to friends, relatives or neighbors of the patient. Alternatively, a third party such as a call center can monitor the alarm signal. Besides monitoring for falls, the system performs video analysis of the patient. For example, during a particular day, the system can determine the amount of time for exercise, sleep, and entertainment, among others. The network of sensors in a patient's home can recognize ordinary patterns—such as eating, sleeping, and greeting visitors—and to alert caretakers to out-of-the-ordinary ones—such as prolonged inactivity or absence. For instance, if the patient goes into the bathroom then disappears off the sensor for 13 minutes and don't show up anywhere else in the house, the system infers that patient had taken a bath or a shower. However, if a person falls and remains motionless for a predetermined period, the system would record the event and notify a designated person to get assistance.

A fall detection process performs the following operations:

Find floor space area
Define camera view background 3D scene
Calculate patient's key features
Detect fall In one implementation, pseudo-code for determining the floor space area is as follows:

1. Sample the camera view space by M by N, e.g. M=1000, N=500.
2. Calculate all sample points the 3D coordinates in room coordinate system; where Z axis is pointing up. Refer to the 3D detection for how to calculate 3D positions.
3. Find the lowest Z value point (Zmin)
4. Find all points whose Z values are less than Zmin+Ztol; where Ztol is a user adjustable value, e.g. 2 inches.
5. If rooms have different elevation levels, then excluding the lowest Z floor points, repeat step 2, 3 and 4 while keeping the lowest Z is within Ztol2 of previous Z. In this example Ztol2=2 feet, which means the floor level difference should be within 2 feet.
6. Detect stairs by finding approximate same flat area but within equal Z differences between them.
7. Optionally, additional information from the user can be used to define floor space more accurately, especially in single camera system where the coordinates are less accurate, e.g.:
   a. Import the CAD file from constructors' blue prints.
   b. Pick regions from the camera space to define the floor, then use software to calculate its room coordinates.

c. User software to find all flat surfaces, e.g. floors, counter tops, then user pick the ones, which are actually floors and/or stairs.

In the implementation, pseudo-code for determining the camera view background 3D scene is as follows:
1. With the same sample points, calculate x, y coordinates and the Z depth and calculate 3D positions.
2. Determine background scene using one the following methods, among others:
   a. When there is nobody in the room.
   b. Retrieve and update the previous calculated background scene.
   c. Continuous updating every sample point when the furthest Z value was found, that is the background value.

In the implementation, pseudo-code for determining key features of the patient is as follows:
1. Foreground objects can be extracted by comparing each sample point's Z value to the background scene point's Z value, if it is smaller, then it is on the foreground.
2. In normal condition, the feet/shoe can be detected by finding the lowest Z point clouds close the floor in room space, its color will be extracted.
3. In normal condition, the hair/hat can be detected by finding the highest Z point clouds close the floor in room space, its color will be extracted.
4. The rest of the features can be determined by searching from either head or toe. E.g., hat, hair, face, eye, mouth, ear, earring, neck, lipstick, moustache, jacket, limbs, belt, ring, hand, etc.
5. The key dimension of features will be determined by retrieving the historic stored data or recalculated, e.g., head size, mouth width, arm length, leg length, waist, etc.
6. In abnormal conditions, features can be detected by detect individual features then correlated them to different body parts. E.g., if patient's skin is black, we can hardly get a yellow or white face, by detecting eye and nose, we know which part is the face, then we can detect other characteristics.

To detect fall, the pseudo-code for the embodiment is as follows:
1. The fall has to be detected in almost real time by tracking movements of key features very quickly. E.g. if patient has black hair/face, track the center of the black blob will know roughly where his head move to.
2. Then the center of mass will be tracked, center of mass is usually around belly button area, so the belt or borderline between upper and lower body closed will be good indications.
3. Patient's fall always coupled with rapid deceleration of center of mass. Software can adjust this threshold based on patient age, height and physical conditions.
4. Then if the fall is accidental and patient has difficult to get up, one or more of following will happen:
   a. Patient will move very slowly to find support object to get up.
   b. Patient will wave hand to camera ask for help. To detect this condition, the patient hand has to be detected first by finding a blob of points with his skin color. Hand motion can be tracked by calculate the motion of the center of the points, if it swings left and right, it means patient is waving to camera.
   c. Patient is unconscious, motionless. To detect this condition, extract the foreground object, calculate its motion vectors, if it is within certain tolerance, it means patient is not moving. In the mean time, test how long it last, if it past a user defined time threshold, it means patient is in great danger.

In one embodiment for fall detection, the system determines a patient fall-down as when the patient's knee, butt or hand is on the floor. The fall action is defined a quick deceleration of center of mass, which is around belly button area. An accidental fall action is defined when the patient falls down with limited movement for a predetermined period.

The system monitors the patients' fall relative to a floor. In one embodiment, the plan of the floor is specified in advance by the patient. Alternatively, the system can automatically determine the floor layout by examining the movement of the patient's feet and estimated the surfaces touched by the feet as the floor.

The system detects a patient fall by detecting a center of mass of an exemplary feature. Thus, the software can monitor the center of one or more objects, for example the head and toe, the patient's belt, the bottom line of the shirt, or the top line of the pants.

The detection of the fall can be adjusted based on two thresholds:
a. Speed of deceleration of the center of mass.
b. The amount of time that the patient lies motionless on the floor after the fall.

In one example, once a stroke occurs, the system detects a slow motion of patient as the patient rests or a quick motion as the patient collapses. By adjust the sensitivity threshold, the system detects whether a patient is uncomfortable and ready to rest or collapse.

If the center of mass movement ceases to move for a predetermined period, the system can generate the warning. In another embodiment, before generating the warning, the system can request the patient to confirm that he or she does not need assistance. The confirmation can be in the form of a button that the user can press to override the warning. Alternatively, the confirmation can be in the form of a single utterance that is then detected by a speech recognizer.

In another embodiment, the confirmatory signal is a patient gesture. The patient can nod his or her head to request help and can shake the head to cancel the help request. Alternatively, the patient can use a plurality of hand gestures to signal to the server 20 the actions that the patient desires.

By adding other detecting mechanism such as sweat detection, the system can know whether patient is uncomfortable or not. Other items that can be monitored include chest movement (frequency and amplitude) and rest length when the patient sits still in one area, among others.

Besides monitoring for falls, the system performs video analysis of the patient. For example, during a particular day, the system can determine the amount of time for exercise, sleep, entertainment, among others. The network of sensors in a patient's home can recognize ordinary patterns—such as eating, sleeping, and greeting visitors—and to alert caretakers to out-of-the-ordinary ones—such as prolonged inactivity or absence. For instance, if the patient goes into the bathroom then disappears off the camera 10 view for a predetermined period and does not show up anywhere else in the house, the system infers that patient had taken a bath or a shower. However, if a person falls and remains motionless for a predetermined period, the system would record the event and notify a designated person to get assistance.

In one embodiment, changes in the patient's skin color can be detected by measuring the current light environment, properly calibrating color space between two photos, and then determining global color change between two states.

Thus, when the patient's face turn red, based on the redness, a severity level warning is generated.

In another embodiment, changes in the patient's face are detected by analyzing a texture distortion in the images. If the patient perspires heavily, the texture will show small glisters, make-up smudges, or sweat/tear drippings. Another example is, when long stretched face will be detected as texture distortion. Agony will show certain wrinkle texture patterns, among others.

The system can also utilize high light changes. Thus, when the patient sweats or changes facial appearance, different high light areas are shown, glisters reflect light and pop up geometry generates more high light areas.

A module 62 analyzes facial changes such as facial asymmetries. The change will be detected by superimpose a newly acquired 3D anatomy structure to a historical (normal) 3D anatomy structure to detect face/eye sagging or excess stretch of facial muscles.

In one embodiment, the system determines a set of base 3D shapes, which are a set of shapes which can represent extremes of certain facial effects, e.g. frown, open mouth, smiling, among others. The rest of the 3D face shape can be generated by blending/interpolating these base shapes by applied different weight to each base shapes.

The base 3D shape can be captured using 1) a 3D camera such as cameras from Steinbichler, Genex Technology, Minolta 3D, Olympus 3D or 2) one or more 2D camera with preset camera field of view (FOV) parameters. To make it more accurate, one or more special markers can be placed on patient's face. For example, a known dimension square stick can be placed on the forehead for camera calibration purposes.

Using the above 3D detection method, facial shapes are then extracted. The proper features (e.g. a wrinkle) will be detected and attached to each base shape. These features can be animated or blended by changing the weight of different shape(s). The proper features change can be detected and determine what type of facial shape it will be.

Next, the system super-imposes two 3D facial shapes (historical or normal facial shapes and current facial shapes). By matching features and geometry of changing areas on the face, closely blended shapes can be matched and facial shape change detection can be performed. By overlaying the two shapes, the abnormal facial change such as sagging eyes or mouth can be detected.

The above processes are used to determine paralysis of specific regions of the face or disorders in the peripheral or central nervous system (trigeminal paralysis; CVA, among others). The software also detects eyelid positions for evidence of ptosis (incomplete opening of one or both eyelids) as a sign of innervation problems (CVA; Horner syndrome, for example). The software also checks eye movements for pathological conditions, mainly of neurological origin are reflected in aberrations in eye movement. Pupil reaction is also checked for abnormal reaction of the pupil to light (pupil gets smaller the stronger the light) may indicate various pathological conditions mainly of the nervous system. In patients treated for glaucoma pupillary status and motion pattern may be important to the follow-up of adequate treatment. The software also checks for asymmetry in tongue movement, which is usually indicative of neurological problems. Another check is neck veins: Engorgement of the neck veins may be an indication of heart failure or obstruction of normal blood flow from the head and upper extremities to the heart. The software also analyzes the face, which is usually a mirror of the emotional state of the observed subject. Fear, joy, anger, apathy are only some of the emotions that can be readily detected, facial expressions of emotions are relatively uniform regardless of age, sex, race, etc. This relative uniformity allows for the creation of computer programs attempting to automatically diagnose people's emotional states.

Speech recognition is performed to determine a change in the form of speech (slurred speech, difficulties in the formation of words, for example) may indicated neurological problems, such an observation can also indicate some outward effects of various drugs or toxic agents.

In one embodiment shown in FIG. 4, a facial expression analysis process performs the following operations:
Find floor space area
Define camera view background 3D scene
Calculate patient's key features
Extract facial objects
Detect facial orientation
Detect facial expression The first three steps are already discussed above. The patient's key features provide information on the location of the face, and once the face area has been determined, other features can be detected by detecting relative position to each other and special characteristics of the features:
Eye: pupil can be detected by applying Chamfer matching algorithm, by using stock pupil objects.
Hair: located on the top of the head, using previous stored hair color to locate the hair point clouds.
Birthmarks, wrinkles and tattoos: pre store all these features then use Chamfer matching to locate them.
Nose: nose bridge and nose holes usually show special characteristics for detection, sometime depend on the view angle, is side view, special silhouette will be shown.
Eye browse, Lips and Moustache: All these features have special colors, e.g. red lipstick; and base shape, e.g. patient has no expression with mouth closed. Software will locate these features by color matching, then try to deform the base shape based on expression, and match shape with expression, we can detect objects and expression at the same time.
Teeth, earring, necklace: All these features can be detected by color and style, which will give extra information.

In one implementation, pseudo-code for detecting facial orientation is as follows:
Detect forehead area
Use the previously determined features and superimpose them on the base face model to detect a patient face orientation.

Depends on where patient is facing, for a side facing view, silhouette edges will provide unique view information because there is a one to one correspondent between the view and silhouette shape.

Once the patient's face has been aligned to the right view, exemplary pseudo code to detect facial expression is as follows:
1. Detect shape change. The shape can be match by superimpose different expression shapes to current shape, and judge by minimum discrepancy. E.g. wide mouth open.
2. Detect occlusion. Sometime the expression can be detected by occlusal of another objects, e.g., teeth show up means mouth is open.
3. Detect texture map change. The expression can relate to certain texture changes, if patient smile, certain wrinkles patents will show up.

4. Detect highlight change. The expression can relate to certain high light changes, if patient sweats or cries, different highlight area will show up.

The cameras in FIGS. 6-7 can communicate over PCIe bus, or can communicate over USB 3.0 protocol (SuperSpeed USB). The theoretical throughput improvement offered by USB 3.0 is a 10× jump over USB 2.0 hardware: USB 2.0 peaks at a theoretical 480 Mbps, while USB 3.0 can theoretically handle up to 5 Gbps. This is done using transmission over differential transceivers and shielded differential pair cables, the details of which can be found at http://www.usb.org/developers/ssusb/. Two differential pairs are used (dual/simplex), and the differential transmission is similar to those used in SATA and PCIe differential transmission techniques.

In one embodiment, the GPUs are used to expedite the motion estimation function, which is the most computationally intensive section of H.264 operations by performing motion estimation in parallel. The term "parallel" to refer to processes that generally run concurrently in a coordinated fashion, but does not require a strict step by step, or clock by clock parallelism.

Figure 8:
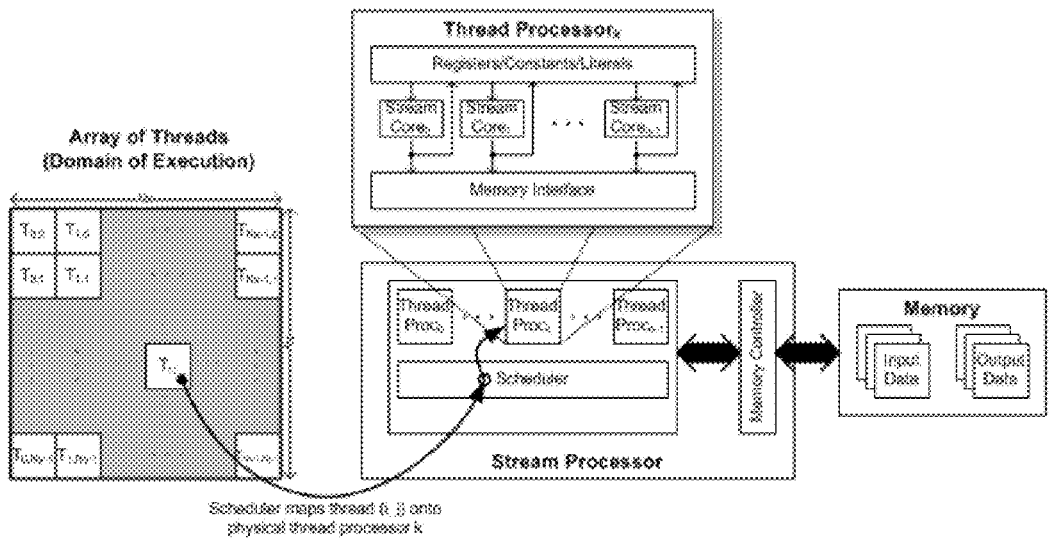
FIG. 8 shows an exemplary stream processing model.

FIG. 8 shows an exemplary stream computing programming model where programmable stream cores execute application specific programs called stream kernels such as video processing kernels. The stream cores operate with a virtualized SIMD programming model operating on streams of data. In stream computing, arrays of input video data are mapped onto a number of SIMD engines which execute kernels to generate video outputs that are written to external memory or to the cloud. Each instance of a kernel is called a thread. A specified region of the output buffer to which threads are mapped is the domain of execution. The stream processor schedules the array of threads onto a group of processors until all threads have been processed. Subsequent kernels can be executed until the application completes.

Figure 9:
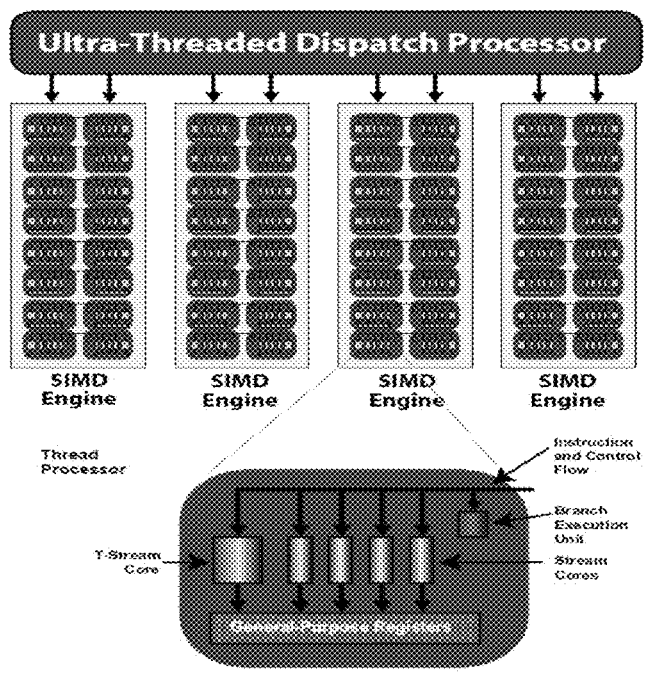
FIG. 9 shows exemplary stream processor which includes groups of SIMD engines.

FIG. 9 shows exemplary stream processor which includes groups of SIMD engines. Each SIMD engine contains numerous thread processors, which are responsible for executing kernels, each operating on an independent data stream. Thread processors in turn contain numerous stream cores, which are programmable computation units that can perform integer, single or double precision floating point and transcendental operations. All thread processors within an SIMD engine execute the same instruction, and different SIMD engines can execute different instructions.

Advanced Video Coding (AVC)

In one embodiment, a video frame is broken down into macroblocks (each macroblock typically covers 16×16 pixels), each macroblock's movement from a previous frame (reference frame) is tracked and represented as a vector, called motion vector. Storing this vector and residual information instead of the complete pixel information greatly reduces the amount of data used to store the video. The pyramid (or hierarchical) motion vector prediction performs motion estimation on a significant downsampled version of the image. The vectors found in this iteration are used as estimates for the motion vector predictions in motion estimation of a slightly less-downsampled image. This process is repeated until the motion estimation is performed on the full-resolution image. One implementation started at a level of sixteen times downsampling and doubled the resolution to eight times. It continued doubling until the motion estimation is done for the full resolution image. One kernel is executed per level of hierarchy. After the kernel was done executing the motion vectors found are left on the device for the next kernel call to minimize the number of host-device memory transfers needed.

In another implementation, the GPUs operates in parallel on "slices" of video data for H.264 encoding, each containing a set of blocks that can be decoded without any other neighboring block information (from outside the slice). At each slice, the predictors are reset, trading off compression efficiency for error resilience. Thus, one slice can be used per line of blocks. If an error is introduced in any given block, the system can recover on the next line of blocks.

The video frames are first placed in to the memory from a capture device such as a camera. The GPU then executes various pixel processes of an encoder resulting in coefficients. These processes include Intra and Inter prediction, mode selection, motion estimation, motion compensation, DCT and IDCT, Quantization and inverse Quantization. The resulting coefficients and metadata is then processed by GPU. The GPU then takes the coefficient and meta data and encodes using a variable length coding process (VLC) resulting in a video stream. If there are multiple slices in the picture, the GPU can process each slice in parallel resulting in higher overall performance.

Each slice in a video stream can be decoded independently of other slices. Slices also contain blocks that are dependent on other blocks in the slice and are best decoded sequentially; therefore, in a preferred embodiment, each slice is decoded using a sequential processor in the GPU, but more than one slice can be decoded in parallel using a group of sequential processors in the GPU. Each sequential processor decodes an assigned slice, and outputs the independent coefficients and metadata into another array for subsequent use. If there are not enough sequential processors for all slices of a frame, slices may be assigned, for example in a round-robin fashion, until all slices are decoded.

Variable sized slices are packed in a buffer that contains the encoded bits from the video stream with all slices packed together. The data is pre-processed by finding the point in the buffer where each slice begins and the pointers for each slice are stored in an index array which is read by each processor in the GPU to find the location of the slice that each processor is responsible for decoding. Once the set of macroblocks in each GPU processor array has been VLC decoded to coefficients and meta data, the resulting (RLE compressed) coefficients and metadata for each block in a slice is stored in an array. Another index table is used to indicate where each macroblock is located in the coefficient buffer. Each processor in the GPU array then reads the address offset for the macroblock data for its decoding assignment. Once all the slices have been decoded, the decompressed slice data is sent for H.264 NAC assembly and decoding of the next frame of slices can be started on the GPU array. Since each macroblock is independent of other macroblocks, the GPU's parallel processors can be applied to decompressing all of the blocks in parallel.

One embodiment also performs scalable video coding using the GPU.

Other operations include:

Video Feature Tracking and Matching

In one embodiment, a KLT tracking process and a SIFT feature extraction process to enable real-time processing of high resolution video. The KLT tracking process computes displacement of features or interest points between consecutive video frames when image motion is fairly small. Feature selection is done by finding maximas of a saliency measure (minimum eigen-values of the 2×2 structure matrix obtained from gradient vectors. It is evaluated over the complete image and a subsequent non-maximal suppression is performed. Assuming a local translational model between subsequent video frames, the feature displacements are computed using Newton's method to minimize the sum of squared distances (SSD) within a tracking window around the feature position in the two images.

A multi-resolution KLT tracker allows handling larger image motion while multiple tracking iterations at each scale increases its accuracy. Features tracks are often lost after a few frames of tracking; hence new features are selected in a particular video frame only after tracking features in a few successive frames. This maintains a roughly fixed number of features in the tracker.

GPU-KLT maps these various steps to sets of different fragment programs. The multi-resolution pyramid of the image and its gradients are computed by a series of two-pass separable convolutions performed in fragment programs. The KLT cornerness map is computed in two render passes. The first pass computes the minimum eigen value of the 2×2 gradient matrix at each pixel and the two passes together accumulate the cornerness value within a 7×7 window centered at each pixel. During feature re-selection, the neighborhood of existing features is invalidated; early Z-culling avoids computations in these image regions. The cornerness map is transferred back to the CPU where non-maximal suppression is done to build the final feature-list. KLT tracking performs a fixed number of tracking iterations at each image resolution starting with the coarsest pyramid level. Each tracking iteration constructs a linear system of equations in two unknowns for each interest point, AX=B and directly solves them to update the estimated displacement. All steps are performed on the GPU. A SSD residual is computed between the two image patches of a particular KLT feature in order to reject features tracked inaccurately. Conditional statements are avoided in fragment programs by tracking a constant number of features and rejecting inaccurate tracks after the final tracking iteration on the GPU and before reading back the feature-list.

The Scale Invariant Feature Transform (SIFT) process performs extraction of interest points invariant to translation, rotation, scaling and illumination changes in images. It first constructs a Gaussian scale-space pyramid from the input image while also calculating the gradients and difference-of-gaussian (DOG) images at these scales. Interest points are detected at the local extremas within the DOG scale space. Once multiple keypoints have been detected at different scales, the image gradients in the local region around each feature point are encoded using orientation histograms and represented in the form of a rotationally invariant feature descriptor. The construction of the Gaussian scale space pyramid is accelerated on the GPU using fragment programs for separable convolution. The intensity image, gradients and the DOG values are stored in a RGBA texture and computed in the same pass. Blending operations in graphics hardware are used to find local extremas in the DOG pyramid in parallel at all pixel locations. The Depth test and the Alpha test is used to threshold these keypoints; The local principal curvatures of the image intensity around the keypoint is inspected; this involves computing the ratio of eigenvalues of the 2£2 Hessian matrix of the image intensity at that point. The keypoint locations are implicitly computed in image-sized, binary buffers, one for each scale in the pyramid. A fragment program compresses (a factor of 32) the binary bitmap into RGBA data, which is readback to the CPU and decoded there. At this stage, a list of keypoints and their scales have been retrieved. Since reading back the gradient pyramid (stored in texture memory) to the CPU is expensive, the subsequent steps in SIFT are also performed on the GPU. Gradient vectors near the keypoint location are Gaussian weighted and accumulated inside an orientation histogram by another fragment program. The orientation histogram is read back to the CPU, where its peaks are detected. Computing histograms on the GPU is expensive and doing it on the CPU along with a small readback is a little faster. The final step involves computing 128 element SIFT descriptors. These consist of a set of orientation histograms built from 16£16 image patches in invariant local coordinates determined by the associated keypoint scale, location and orientation. SIFT descriptors cannot be efficiently computed completely on the GPU, as histogram bins must be blended to remove quantization noise. This step is partitioned between the CPU and the GPU. Each feature's gradient vector patch is resampled, weighted using a Gaussian mask using blending support on the GPU. The resampled and weighted gradient vectors are collected into a tiled texture block which is subsequently transferred back to the CPU and then used to compute the descriptors. This CPU-GPU partition was done to minimize data readback from the GPU since transferring the whole gradient pyramid back to the CPU is impractical. Moreover texture re-sampling and blending are efficient operations on the GPU and are performed there. This also produces a compact tiled texture block which can be transferred to the CPU in a single read back. GPU-SIFT gains a large speed-up in the Gaussian scale-space pyramid construction and keypoint localization steps. The compressed readback of binary images containing feature positions reduces the readback data-size by a factor of 32. The feature orientation and descriptors computation is partitioned between the CPU and GPU in a way that minimizes data transfer from GPU to CPU.

Video Conferencing Compression

In one embodiment, the video feature tracking and matching described above is used to compress conferencing sessions. Typically, in videoconferencing, the background remains the same, but the facial expression can change. The operation is as follows:
1) send the first few minutes of video using conventional or compressed video and simultaneously determine predetermine facial and body features;
2) after the start up period, for each frame determine whether the current frame only has facial/body changes and if so
    look for an updated position of the features and transmit a vector indicating facial and body feature changes to the remote computer
    the remote computer converts the vector of changed facial features to an image of the user's face and body position
3) otherwise, there are significant changes to the frame and so loop back to (1) to do a fresh compression cycle.

The process achieves a very high compression ratio since only a vector of feature position changes are sent as a vector and the vector is converted back into frame image by the remote computer. Moreover, if significant scene changes occur (such as new participants entering the conference, or participant picks up a book and show book to the camera), then the system reverts back to H.264 compression of full image.

Face Recognition

Face detection can be performed on board the camera for autofocus of the camera. Additionally, the face detection can be used to identify regions in the video that should be encoded at high resolution for certain applications.

A parallelized implementation of convolutional neural networks (CNNs) is done with parallelizing the detection process using the GPU. The convolutional network consists of a set of layers each of which contains one or more planes. Approximately centered and normalized images enter at the input layer. Each unit in a plane receives input from a small neighborhood in the planes of the previous layer. The idea of connecting units to local receptive fields dates back to the 1960s with the perceptron and Hubel and Wiesel's discovery of locally sensitive, orientation-selective neurons in the cat's visual system. The general strategy of a convolutional network is to extract simple features at a higher resolution, and then convert them into more complex features at a coarser resolution. The simplest was to generate coarser resolution is to sub-sample a layer by a factor of 2. This, in turn, is a clue to the convolutions kernel's size.

The weights forming the receptive field for a plane are forced to be equal at all points in the plane. Each plane can be considered as a feature map which has a fixed feature detector that is convolved with a local window which is scanned over the planes in the previous layer. Multiple planes are usually used in each layer so that multiple features can be detected. These layers are called convolutional layers.

The GPU supports a fast, automatic system for face recognition which is a combination of a local image sample representation, a self-organizing map network, and a convolutional network for face recognition. For the images in the training set, a fixed size window is stepped over the entire image and local image samples are extracted at each step. At each step the window is moved by 4 pixels. Next, a self-organizing map (e.g. with three dimensions and five nodes per dimension) is trained on the vectors from the previous stage. The SOM quantizes the 25-dimensional input vectors into 125 topologically ordered values. The three dimensions of the SOM can be thought of as three features. The SOM can be replaced with the Karhunen-Loeve transform. The KL transform projects the vectors in the 25-dimensional space into a 3-dimensional space. Next, the same window as in the first step is stepped over all of the images in the training and test sets. The local image samples are passed through the SOM at each step, thereby creating new training and test sets in the output space created by the self-organizing map. (Each input image is now represented by 3 maps, each of which corresponds to a dimension in the SOM. The size of these maps is equal to the size of the input image divided by the step size. A convolutional neural network, or alternatively a multilayer perceptron neural network, is trained on the newly created training set.

The self-organizing map provides a quantization of the image samples into a topological space where inputs that are nearby in the original space are also nearby in the output space, which results in invariance to minor changes in the image samples, and the convolutional neural network provides for partial invariance to translation, rotation, scale, and deformation. Substitution of the Karhunen-Lo'eve transform for the self organizing map produced similar but slightly worse results. The method is capable of rapid classification, requires only fast, approximate normalization and preprocessing, and consistently exhibits better classification performance than the eigenfaces approach on the database considered as the number of images per person in the training database is varied from 1 to 5.

Face Detection/Gesture Detection

As discussed above, a parallelized implementation of convolutional neural networks (CNNs) is done with parallelizing the detection process using the GPU. This can be used for autofocus of the camera. Once the face is detected, the GPUs can also be used to detect gestures as commands.

Motion features are first computed on the input image sequence (stationary camera assumed). The face detector is then employed to obtain a user-centric representation, and again a classifier to discriminate between gestures is learned using a variant of AdaBoost. A real-time version of this classifier is deployed using the GPU.

To calculate the motion features, the optical flow for each frame is determined. The optical flow vector field F is then split into horizontal and vertical components of the flow, Fx and Fy, each of which is then half-wave rectified into four non-negative channels Fx+, Fx−, Fy+, Fy−. A channel corresponding to motion magnitude F0 is obtained by computing the L2 norm of the four basic channels. These five non-negative channels are then normalized to facilitate gesture recognition in soft-real time where frame rates can be variable, and to account for different speed of motion by different users.

Given a vector v that represents the optical flow for a given pixel, the system computes $v=v/(\|v\|+e)$, where e is used to squash optical flow vectors with very small magnitude introduced by noise. Next, each of the five channels is box-filtered to reduce sensitivity to small translations by the user performing the gesture. This final set of five channels: ^Fx+, ^Fx−, ^Fy+, ^Fy−, ^F0 will be used as the motion features for each frame.

A gesture is represented as a collection of movements required to complete a single phase of the gesture, rather than just capture a subset of the gesture phase. Hence, the system aggregates the motion features over a temporal history of the last k frames, for some k which is large enough to capture all frames from a gesture phase.

Face detection is used to create a normalized, user centric view of the user. The image is scaled based on the radius of the detected face, and is then cropped and centered based on the position of the face. The frame is cropped and resized to a 50×50 pixel region centered around the user. All five motion feature channels described above are flattened into a single vector which will be used to determine the gesture being performed.

A multi-class boosting process AdaBoost is used such as the one at http://multiboost.sourceforge.net. AdaBoost takes the motion features as input. The supervised training is based on a set of labeled gestures. A set of weak learners is generated based on thresholding value from a particular component of the motion feature vector. The output of the final strong learner on motion feature v for class label is determined using weights chosen by Ada Boost.

Panaroma Stitching

Referring back to the telepresence video conferencing system of FIG. 2, the GPUs of FIGS. 4-7 can perform panaroma stitching so that 3 inexpensive cameras can be used to provide a 180 degree immersive view. The GPU operations are done pipeline fashion as follows: Radial Distortion Correction. Next, the GPUs perform Keypoint Detection & Extraction (Shi-Tomasi/SIFT). Keypoint Matching is done, and the GPUs recover Homography (RANSAC). Next, the GPUs create a Laplacian Pyramid. A Projective Transform is done, and a Multi-Band Blend is the last stage of the pipeline.

Object Recognition

The CPU/GPU can identify video objects and then generate metadata for video objects contained within the captured video frames. For each of the captured video frames, the CPU/GPUs may execute program instructions to: (i) detect whether the video frame contains a video object, (ii) generate meta data for each detected video object, and (iii)

cause data storage to store the relevant portions of the video and the metadata describing objects in the video for search purposes.

Generating the metadata may be carried out in various ways. For instance, generating the meta data may be carried out by segmenting video objects within a video frame and then representing features of each segmented video object. As an example, the feature representation may be color appearance information, that is, the analytical data may comprise color data based on the color or colors of a video object. The analytical data based on the color or colors of a video object may include any of a variety of color data. For example, for any given video object, the color data may include Red Green Blue (RGB) color space data, Hue Saturation Value (HSV) color space data, YCrCb color space data, and/or YUV color space data.

As another example, the metadata may include data based on pixel intensity, data indicating which pixels are part of the video object, a unique identifier of the video object, and/or structural information associated with the video object. The structural information may include information pertaining to edges, curvature, and/or texture of the video object, for example. The structural information may include information that indicates how close a structure of the video object matches a circle, rectangle, star, or some other arbitrary shape. The metadata may also include confidence measures of the other types of data in the metadata. The confidence measures may indicate a determination of how likely a video object is a given type of object, such as a vehicle, person, animal, bag, or some other type of object.

In one embodiment, the GPU detects an object using color and then tracks the object by:
1. Create a masking image by comparing each pixel with a target color value. Convert pixels that fall within the range to white, and convert those that fall outside the range to black.
2. Find the centroid of the target color. The centroid of the tracked color defines the center position for the overlay image. A multipass pixel-processing kernel is used to compute a location. The output of this phase is a 1×1-pixel image, containing the coordinate of the centroid in the first two components (pixel.rg) and the area in the third component (pixel.b). The area is used to estimate the distance of the object from the camera.
3. Composite an image over the detected object. Assuming the shape of the object does not change with respect to the frame, then the change in area of the tracked color is proportional to the square of the distance of the object from the viewer. This information is used to scale the overlay image, so that the overlay image increases or decreases in size appropriately.

In another embodiment, Shape-Based Matching (SBM) is used for recognizing partially occluded objects which is very robust against illumination changes. It is closely related to correlation. The main difference is that SBM uses the inner product of normalized edge gradient vectors as similarity measure instead of raw image intensity. To recognize an object, the search image is correlated with the model using the similarity measure of SBM. The model image is fitted in all possible translations within the search image and a score is assigned to each position. As correlation based methods do not cope with any other object transformation those must be handled by evaluating the results of multiple correlations.

In one embodiment, a Hough transform (HT) can be used to recognize any analytically describable shape]. A generalization of the Hough transform (GHT) who manages any discrete shape is also available [1]. Ulrich presents a modification of the generalized Hough transform (MGHT), gaining real-time performance by taking advantage of resolution hierarchies, which is not as straight forward as it might first seem. The principles of it are described below. Initially, a model of the object to be recognized is generated. A gradient map is generated from the model image and edges are extracted. Then a table, mapping edge gradient direction (represented as an angle) to offset vectors to the center of the model, is created.

In the search procedure a gradient map of the search image is used. For each gradient direction (represented as an angle) a number of displacement vectors are looked up using the table. A vote is placed on each position pointed at by a displacement vector. If the point belongs to an edge of the object, at least one of the vectors point at the center of the object that is to be found, and a vote will be placed for that position. After this is done, a peak has appeared in the voting space at the center of the object as this is the single point that the most dislocation vectors points at (at least one for each gradient belonging to the edge of the object in the search image).

To utilize a resolution pyramid the model image is divided into tiles for all levels but the coarsest. A separate lookup table is generated for each tile. Searching then begins with a regular search at the coarsest pyramid level which yields a coarse position of the object which will be refined for each level in the pyramid.

In the refinement, the entire gradient map is considered as before, but only the mapping table connected to the tiles that have dislocation vectors pointing to a neighborhood of the known position are evaluated for each gradient. This way the amount of votes to place, and the voting space itself is much smaller than before.

In another embodiment, a chamfer distance transform of an edge image is used as a model. Another edge image is extracted from the search image. To find the position of the object a similarity measure is evaluated for each potential position (as for cross correlation). The similarity measure is the mean distance from each edge in the search image to the closest edge in the model for the current translation. This is obtained by accumulating samples from the distance map of the model for each edge in the search image. If there is a perfect match, the mean distance is 0.

Other object recognition techniques can be used to tap into the GPU's parallel stream processing.

Cloud Based Parallel Video Search Engine

Preferably the video data can be operated in parallel using clusters of cloud based processors. Video analysis applications from anywhere in the world can, after authentication and security clearance, access and analyze video data that represents video streams in parallel, and annotate portions of the video data (e.g., frames and groups of frames), based on the analyses performed, with information that describes the portion of the video data. From an event stored in the database, the associated frames and/or groups of frames can be replayed for further human-based or application-based analyses. Applications plugged into the pipeline, via application program interfaces (APIs), can perform complex analyses and update the search engine in parallel.

The system identifies video objects and then generates metadata for video objects contained within the captured video frames. For each of the captured video frames, the CPU/GPUs may execute program instructions to: (i) detect whether the video frame contains a video object, (ii) generate meta data for each detected video object, and (iii) cause data storage to store the relevant portions of the video and the metadata describing objects in the video for search purposes.

The system can generate metadata live at the camera end, or alternatively can generate data using processors in the EC2 compute cloud operating on data stored in the S3 cloud data storage, in one embodiment. Generating the metadata may be carried out in various ways. For instance, generating the meta data may be carried out by segmenting video objects within a video frame and then representing features of each segmented video object. As an example, the feature representation may be color appearance information, that is, the analytical data may comprise color data based on the color or colors of a video object. The analytical data based on the color or colors of a video object may include any of a variety of color data. For example, for any given video object, the color data may include Red Green Blue (RGB) color space data, Hue Saturation Value (HSV) color space data, YCrCb color space data, and/or YUV color space data.

As another example, the metadata may include data based on pixel intensity, data indicating which pixels are part of the video object, a unique identifier of the video object, and/or structural information associated with the video object. The structural information may include information pertaining to edges, curvature, and/or texture of the video object, for example. The structural information may include information that indicates how close a structure of the video object matches a circle, rectangle, star, or some other arbitrary shape. The metadata may also include confidence measures of the other types of data in the metadata. The confidence measures may indicate a determination of how likely a video object is a given type of object, such as a vehicle, person, animal, bag, or some other type of object.

A user can search a video database by providing examples of the people and/or objects for whom they are looking. This is sometimes referred to as query by example. One use of the system is for determining actions taken before an event. For example, by examining the video data recorded by a security system in a place of business over the course of a week, one can determine the routes taken through a building by a particular person, or develop a list of all people someone interacted with while in a building that particular week.

In one approach discussed in US Pat. 20080204569, the content of which is incorporated by reference, a covariance matrix based appearance model is used. Specifically, this covariance matrix appearance model is used to query both within a single camera and with multiple cameras. There are several advantages of the covariance appearance model. First, it can efficiently fuse many heterogeneous features. Second, it does not require motion information of objects and third can handle rigid and non-rigid objects observed by non-stationary cameras. Therefore it is robust to objects' pose and illumination changes which can occur when tracking across different cameras. This is particularly advantageous when the video repository contains video data from non-overlapping cameras, where the views of the different cameras can be different and the appearance of the objects might vary greatly in scale, pose, and shape. In one particular embodiment, the system performs its query of the video data based on a blob appearance model. In this embodiment, an appearance model for a blob is first defined. Since a goal of such a system is to support un-calibrated non-overlapping cameras, the appearance models have to be robust to changes in color, scale, pose, and other similar appearance factors.

In one embodiment, the elastic cloud compute (EC2) provides a plurality of processor to search for objects in the captured videos. Each video object is included in only one frame. In this regard, each video object is unique. However, multiple video frames may include a video object that represents a particular object captured on the video frames, and the multiple video frames may be captured by one or more video cameras. A particular object captured on a video frame may include a person, a group of people, an item carried by a person or the group of people, an animal, a vehicle, or some other arbitrary object that may be captured on a video frame (e.g., any object within a video frame). Analytical data may be determined for video objects that are detected as being in motion at the time the video objects are captured. Any video object of interest to a user may be selected by the user while a video frame comprising that video object is being displayed.

One embodiment uses Amazon's SimpleDB which stores items in domains. Items contain one or more attribute-value pairs. Each attribute can have multiple values. Queries let users perform range & equality operators (including 'starts-with') comparing attribute values to constant values. Queries can have multiple conditions on a given attribute, and can union and intersect sets of results across different attributes. Queries return paged result sets of item names. Item names can then be pulled in parallel from SimpleDB to get the full set of attribute-value pairs for each item. An Inverted Index on SimpleDB is done that supports 'sharding'. Ferret's DefaultAnalyzer tokenizes the input and filter terms. The overall goal is to build an inverted index of terms that will let the system quickly looks up which video sequences contain which features. The system has a textual index running in the cloud with shards, fields, suffix matching, and exact phrase matching, with boolean operator.

Amazon SimpleDB is a web service for running queries on structured data in real time. This service works in close conjunction with Amazon Simple Storage Service (Amazon S3) and Amazon Elastic Compute Cloud (Amazon EC2), collectively providing the ability to store, process and query data sets in the cloud. These services are designed to make web-scale computing easier and more cost-effective for developers.

Amazon SimpleDB service was built to support massively parallel operations. To improve the put performance, the system can distribute the data among multiple threads, or processes, that execute BatchPutAttributes calls in parallel. The improvement is proportional to the number of threads. Parallelizing queries by splitting the search range can also be done. The pattern for executing parallel queries that are independent from each other is very similar to executing any other request: the application spawns multiple threads or processes, and each one is responsible for processing Select calls against Amazon SimpleDB independently. In a use case for parallelizing queries that involves retrieving a large number of pages for a single query expression, the system splits the search range into multiple segments to parallelize across these segments.

Building applications that work well in a networked environment with unpredictable latencies opens a new set of potential error conditions when compared to typical desktop or client-server applications. Invoking requests to a web service such as Amazon SimpleDB, whether over the Internet or from an EC2 instance within the Amazon cloud, requires application designers to consider issues such as network connectivity, request timeouts and remote errors due to overload or throttling. There are numerous components on the network, such as DNS servers, switches, load-balancers, and others that could generate errors anywhere in the life of a given request.

Once a request arrives at the service, Amazon SimpleDB uses standard HTTP error codes to communicate server and overload errors through the REST interface. One technique for dealing with such error responses in a networked environment is to implement retries in the client application layer, regardless of whether those errors come from the service itself or any component on the network between Amazon SimpleDB and client application. This technique increases the reliability of the applications and reduces operational costs for the developer. In addition to simple retries, we an exponential backoff algorithm can be used for better flow control. Exponential backoff uses progressively longer waits between retries for consecutive error responses: up to 400 milliseconds before the first retry, up to 1600 milliseconds before the second, up to 6400 milliseconds before third, and so on. The exponential back off algorithm is as follows:

```
currentRetry = 0
DO
    status = execute Amazon SimpleDB request
    IF status = success OR status = client error (4xx)
        set retry to false
        process the response or client error as appropriate
    ELSE
        set retry to true
        currentRetry = currentRetry + 1
        wait for a random delay between 0 and (4^currentRetry * 100)
        milliseconds
    END-IF
WHILE (retry = true AND currentRetry < MaxNumberOfRetries)
```

A user can perform a "seed search" (i.e., a search of a subset of the analytical data) to identify video objects that most closely match the selected video object. The identified video objects that most closely match the selected video object may include the selected video object. The subset of analytical data may comprise analytical data for which there is a high probability that the data will correspond to video objects that most closely match the selected video object.

A "complete search" (i.e., a search of the entire set of analytical data) may be carried out for each of the video objects identified during the seed search so as to identify video objects that most closely match the video objects identified during the seed search. Thereafter, the video frames comprising the video objects identified during the complete searches may be displayed at a display device.

After performance of the seed search and the complete searches, a user may view video frames in which the selected video object appears and/or video frames in which a video object identified as one of a plurality of video objects most closely matching the selected video object appear, without having to view video frames in which the selected video object or video objects identified as most closely matching the selected video object do not appear. In this way, the user does not have to waste time viewing video frames that are not of interest to the user.

Additionally, while viewing the video frames comprising video objects detected during a seed search and/or a complete search, the user may select another video object displayed in a viewed video frame. The other video object may comprise an object that interacts with the previously selected video object. Thereafter, the system may perform a seed search for the other video object so as to detect video objects that most closely match the other video object, and then perform one or more complete searches for video objects that most closely match the detected video object that most closely matches the other video object. Video frames comprising the other video object and/or video objects that most closely match the other video object may be displayed at the display device.

Although parallel video searching is described above, alternatively, the cloud based processors can be configured as a sequential processing systems where video analysis applications can access and analyze video data that represents video streams flowing through the pipeline, and annotate portions of the video data (e.g., frames and groups of frames), based on the analyses performed, with information that describes the portion of the video data. These annotations flow through the pipeline, possibly along with corresponding frames or groups of frames, to subsequent stages of processing, at which increasingly complex analyses can be performed. Analyses performed at the various stages of the pipeline can take advantage of the analyses performed at prior stages of the pipeline through use of the information embodied in the annotations. At each stage of the pipeline, portions of the video streams determined to be of no interest to subsequent stages are removed from the video data, which reduces the processing requirements of the subsequent stages.

From an event stored in the database, the associated frames and/or groups of frames can be replayed for further human-based or application-based analyses. Generally, as the videos flow down the pipeline, (1) portions of the videos or frames that are considered uninteresting to all the applications at a given stage are removed, thereby reducing the amount of data that flows further down the pipeline; (2) portions of the videos or frames that are considered interesting to an application at a given stage are analyzed, with a goal of identifying features, activities, objects, etc. of interest; and (3) analyzed portions of the videos or frames are annotated by the applications with information that describes what the applications identified as interesting in that portion of the video. In one embodiment, the pipeline comprises four different successive stages of processing: (1) quick frame processing; (2) deep frame processing; (3) cluster processing; and (4) database processing. Due to the nature of the pipeline, applications plugged into the pipeline, via application program interfaces (APIs) associated with each respective stage, can perform increasingly more complex analyses at each successive stage of processing.

GUI for Parallel Search

Figure 10:
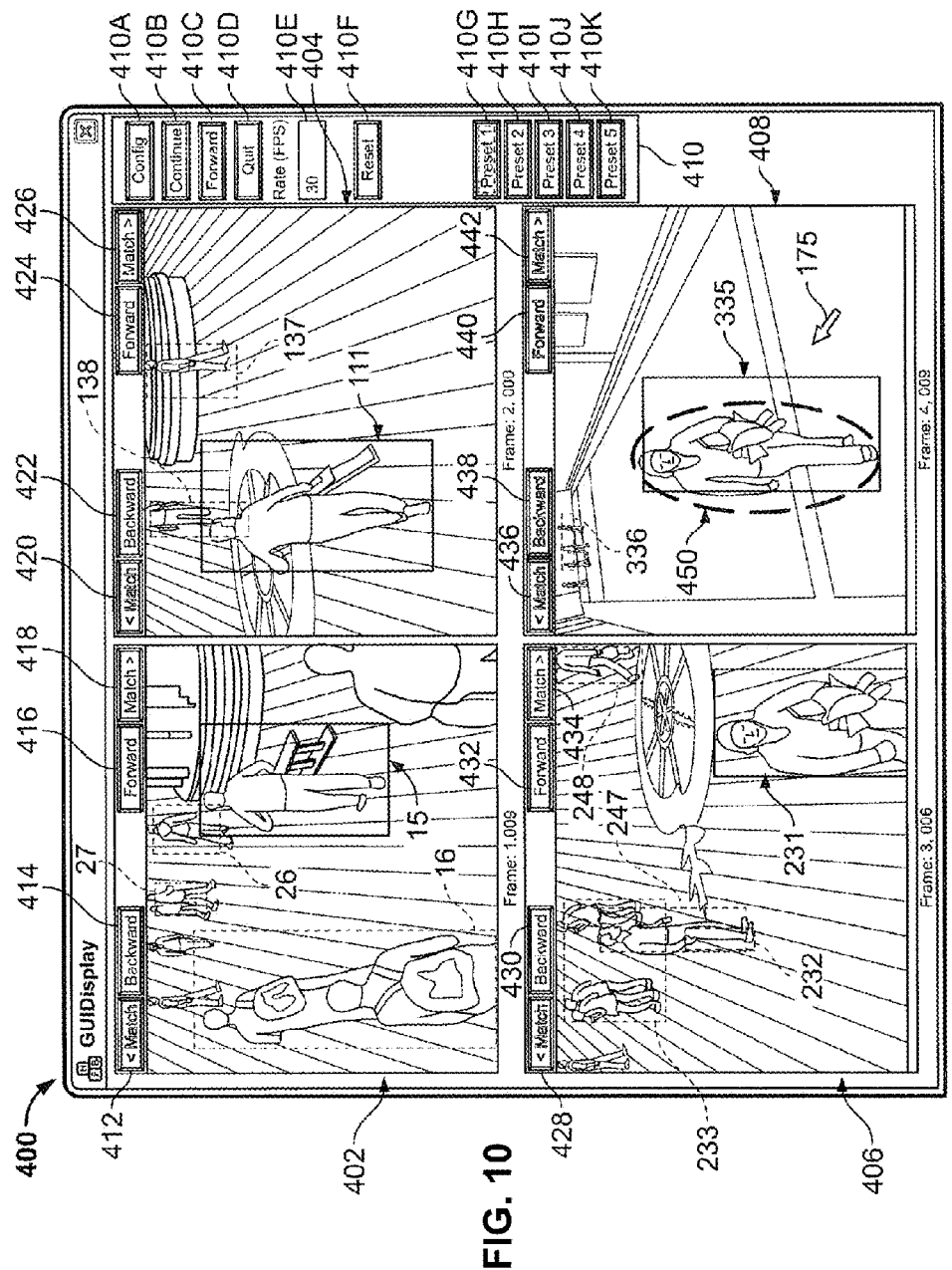
FIG. 10 shows an exemplary video search graphical user interface.

In FIG. 10, video objects contained in a video frame are identified by a rectangle, and a selected video object in a video frame is identified by an ellipse, such as ellipse 450 shown in FIG. 3. In particular, a video object identified by a solid-line rectangle indicates that video object has been identified as a video object that most closely matches the selected video object, whereas a video object identified by a dashed-line rectangle indicates that video object has not been identified as a video object that most closely matches the selected video object.

The rectangles and ellipses are not part of the video frame captured by a video camera but may be overlaid on the video frame when the video frame is displayed via GUI 400. Other means for indicating the presence of a video object in a video frame may also be used, such as an outline of another shape (e.g., a circle, a polygon, and/or an outline of the video object) and other means for indicating the presence of a selected video object may also be used. The rectangle or other shape may indicate an outer boundary of all the pixels of the video object such that the video object includes all of the pixels within the shape.

In FIG. 10, video frame 1, 009 is displayed in video frame window 402, video frame 2, 000 is displayed in video frame window 404, video frame 3, 006 is displayed in video frame window 406, and video frame 4, 009 is displayed in video frame window 408. Video frame 1, 009 includes video objects 15, 16, 26, 27. Video frame 2, 000 includes video objects 111, 137, 138. Video frame 3, 006 includes video objects 231, 232, 233, 247, 248. Video frame 4, 009 includes video objects 335, 336. Video object 335 is a selected video object as indicated by ellipse 450. In FIG. 3, video objects 15, 111, 231, and 335 have been identified as video objects most closely matching the selected video object 335 in video frames 1, 009, 2, 000, 3, 006, and 4, 009, respectively. The user can select each video object in FIG. 10 to be searched by drag-and-drop a rectangular region and the GUI shows a dashed line rectangle in response. After performing the search for video objects that most closely match the selected video object, each video frame displayed at GUI may include a video object identified by a solid line rectangle indicating that video object most closely matches the selected video object. Alternatively, if no video objects in video frames captured by a given video camera are identified as most closely matching the selected video object, then the video frame window 402 for the given video camera may provide an indication that no video frames were captured by the given video camera. The indication may be a blank video display window, a video frame test pattern, or some other indication.

A given object may appear in a non-contiguous series of video frames captured by a single video camera. Thus, a search for video frames that include video objects matching the given object may result in identifying video objects from a non-contiguous series of video frames captured by one or more video cameras.

Exemplary embodiments of the present invention have been described above. Those skilled in the art will understand, however, that changes and modifications may be made to the embodiments described without departing from the true scope and spirit of the present invention, which is defined by the claims.

Finally, the word "exemplary" is used herein to mean "serving as an example, instance, or illustration." Any embodiment described herein as "exemplary" is not necessarily to be construed as preferred or advantageous over other embodiments.

What is claimed is:

1. A smart camera, comprising:
   an imager;
   a video analytic engine (VA) coupled to the imager;
   an advanced video coding (AVC) engine coupled to the imager; and
   a network processor coupled to the VA engine and the AVC engine,
   wherein the VA engine and the AVC engine run on a graphic processing unit (GPU) having a plurality of processors to process a plurality of computing threads and wherein the imager and the GPU are enclosed in a camera housing,
   wherein the GPU generates metadata with the video to form content-aware video stored in a cloud data store, and the content-aware cloud data store includes video analytics that analyzes the content of the video data and local video data stores that store portions of the video data in response to analysis by the VA engine, and wherein video data is delivered as a managed amount of video data representing a specified quality level for a field of view.

2. The smart camera of claim 1, wherein the AVC engine comprises an H.264 engine.

3. The smart camera of claim 1, wherein the AVC engine performs scalable video coding (SVC).

4. The smart camera of claim 1, wherein the VA engine comprises a cellular neural network (CNN).

5. The smart camera of claim 1, wherein (Original) The smart camera comprises a video conferencing system, a security system or a machine vision system.

6. The smart camera of claim 1, wherein a video comprises a plurality of video slices and wherein the VA engine and the AVC engine runs on a plurality of processors each processing a slice.

7. The smart camera of claim 1, comprising a call center coupled to the network processor.

8. The smart camera of claim 1, comprising an elastic compute cloud coupled to the network processor.

9. The smart camera of claim 1, comprising a cloud based data storage device coupled to the network processor.

10. The smart camera of claim 1, comprising a parallel search engine coupled to the cloud based data storage device.

11. A smart camera, comprising:
    an imager to capture a video;
    a video analytic (VA) engine coupled to the imager, the VA engine detecting objects in an image and generating metadata for each object and video;
    an advanced video coding (AVC) engine coupled to the imager; and
    a network processor coupled to the VA engine and the AVC engine, wherein the VA engine and the AVC engine comprise a graphic processing unit (GPU) having a plurality of processors to process a plurality of computing threads and wherein the imager and the GPU are enclosed in a camera housing; and
    a cloud based data storage device coupled to the network processor to store the video and affiliated metadata,
    wherein the GPU generates metadata with the video to form content-aware video stored in a cloud data store, and the content-aware cloud data store includes video analytics that analyzes the content of the video data and local video data stores that store portions of the video data in response to analysis by the VA engine, and wherein video data is delivered as a managed amount of video data representing a specified quality level for a field of view.

12. The smart camera of claim 11, wherein the AVC engine comprises an H.264 engine.

13. The smart camera of claim 11, wherein the AVC engine performs scalable video coding (SVC).

14. The smart camera of claim 11, wherein the VA engine comprises a cellular neural network (CNN).

15. The smart camera of claim 11, wherein the smart camera comprises a video conferencing system, a security system or a machine vision system.

16. The smart camera of claim 11, wherein a video comprises a plurality of video slices and wherein the VA engine and the AVC engine runs on a plurality of processors each processing a slice.

17. The smart camera of claim 11, comprising a call center coupled to the network processor.

18. The smart camera of claim 11, comprising an elastic compute cloud coupled to the network processor.

19. The smart camera of claim 11, wherein the cloud based data storage device comprises a parallel database.

20. The smart camera of claim 11, comprising a parallel search engine coupled to the cloud based data storage device.

* * * * *